United States Patent
Ueki

(10) Patent No.: US 9,846,552 B2
(45) Date of Patent: Dec. 19, 2017

(54) MEMORY DEVICE AND STORAGE SYSTEM HAVING THE SAME

(71) Applicant: TOSHIBA MEMORY CORPORATION, Tokyo (JP)

(72) Inventor: Katsuhiko Ueki, Katsushika Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 14/842,626

(22) Filed: Sep. 1, 2015

(65) Prior Publication Data

US 2016/0139847 A1    May 19, 2016

Related U.S. Application Data

(60) Provisional application No. 62/079,051, filed on Nov. 13, 2014.

(51) Int. Cl.
*G06F 12/06* (2006.01)
*G06F 3/06* (2006.01)
*G06F 12/00* (2006.01)

(52) U.S. Cl.
CPC .......... *G06F 3/0638* (2013.01); *G06F 3/061* (2013.01); *G06F 3/0688* (2013.01); *G06F 12/00* (2013.01)

(58) Field of Classification Search
CPC ........ G06F 3/0638; G06F 12/00; G06F 3/061; G06F 3/0688; G06F 3/06
USPC ................................................. 711/170, 103
See application file for complete search history.

(56) References Cited

U.S. PATENT DOCUMENTS

| | | | |
|---|---|---|---|
| 6,430,650 B1 | 8/2002 | Miyauchi | |
| 7,636,833 B2 * | 12/2009 | Tremaine | G06F 12/0607 711/207 |
| 8,407,449 B1 | 3/2013 | Colon et al. | |
| 2006/0129749 A1 * | 6/2006 | Nakanishi | G06F 3/0613 711/103 |
| 2013/0151765 A1 * | 6/2013 | Wong | G06F 12/0246 711/103 |
| 2013/0227246 A1 * | 8/2013 | Hirao | G06F 12/0246 711/206 |
| 2013/0246689 A1 | 9/2013 | Matsudaira et al. | |
| 2014/0281333 A1 * | 9/2014 | Peterson | G06F 12/0638 711/170 |
| 2014/0325313 A1 * | 10/2014 | Chan | G06F 11/1048 714/764 |
| 2016/0085612 A1 * | 3/2016 | Liu | G06F 11/0793 714/6.13 |

\* cited by examiner

*Primary Examiner* — Pierre-Michel Bataille
(74) *Attorney, Agent, or Firm* — Patterson & Sheridan, LLP

(57) ABSTRACT

A memory device includes a nonvolatile memory and a memory controller. The memory controller is configured to receive an access command with respect to a cluster of the nonvolatile memory, the access command including a size of the cluster and a logical address corresponding to a part of the cluster, translate the logical address to a physical address in the nonvolatile memory, by referring to a table storing physical addresses corresponding to part of logical addresses of the nonvolatile memory, identify all physical addresses corresponding to the cluster, based on the size of the cluster, the translated physical address, and an algorithm that generates a sequence for accessing the nonvolatile memory, and access the cluster of the nonvolatile memory in accordance with the identified physical addresses.

20 Claims, 24 Drawing Sheets

Table T1 (First embodiment)

| Channel (CH0~CH3) | Pos (0~3) |
|---|---|
| 0 | 0 |
| 0 | 1 |
| 0 | 2 |
| 0 | 3 |
| 1 | 0 |
| 1 | 1 |
| 1 | 2 |
| 1 | 3 |
| 2 | 0 |
| 2 | 1 |
| 2 | 2 |
| 2 | 3 |
| 3 | 0 |
| 3 | 1 |
| 3 | 2 |
| 3 | 3 |

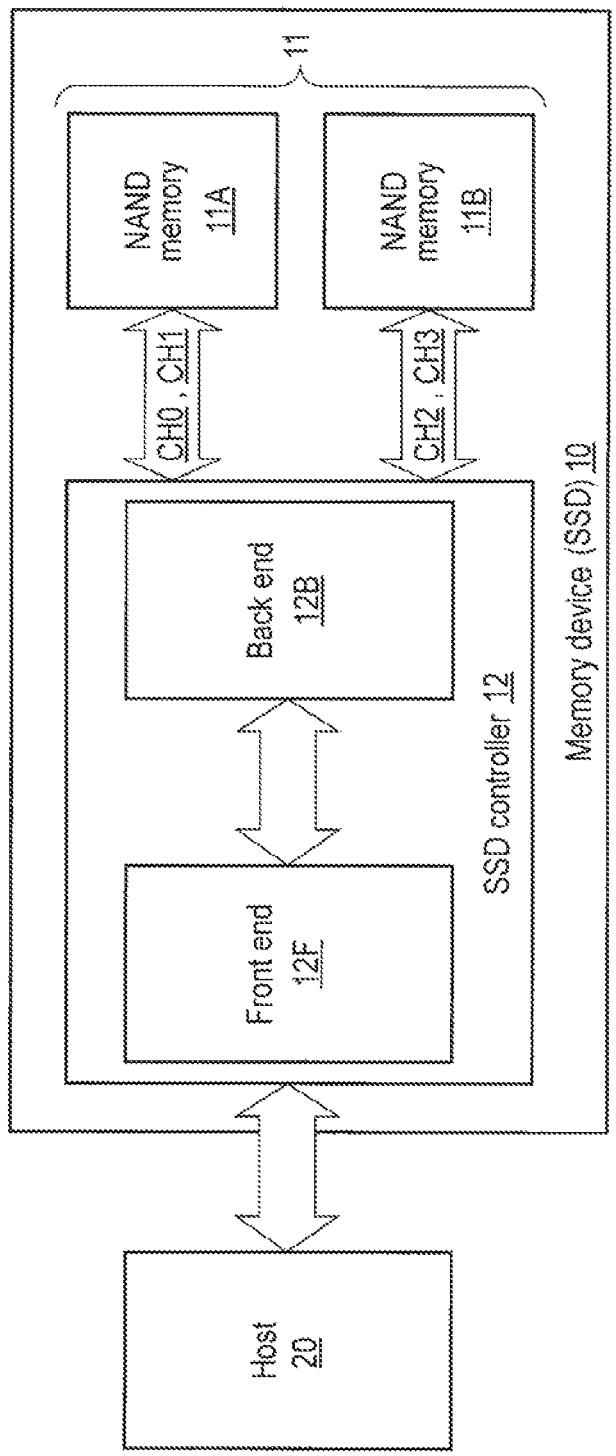
F I G. 2

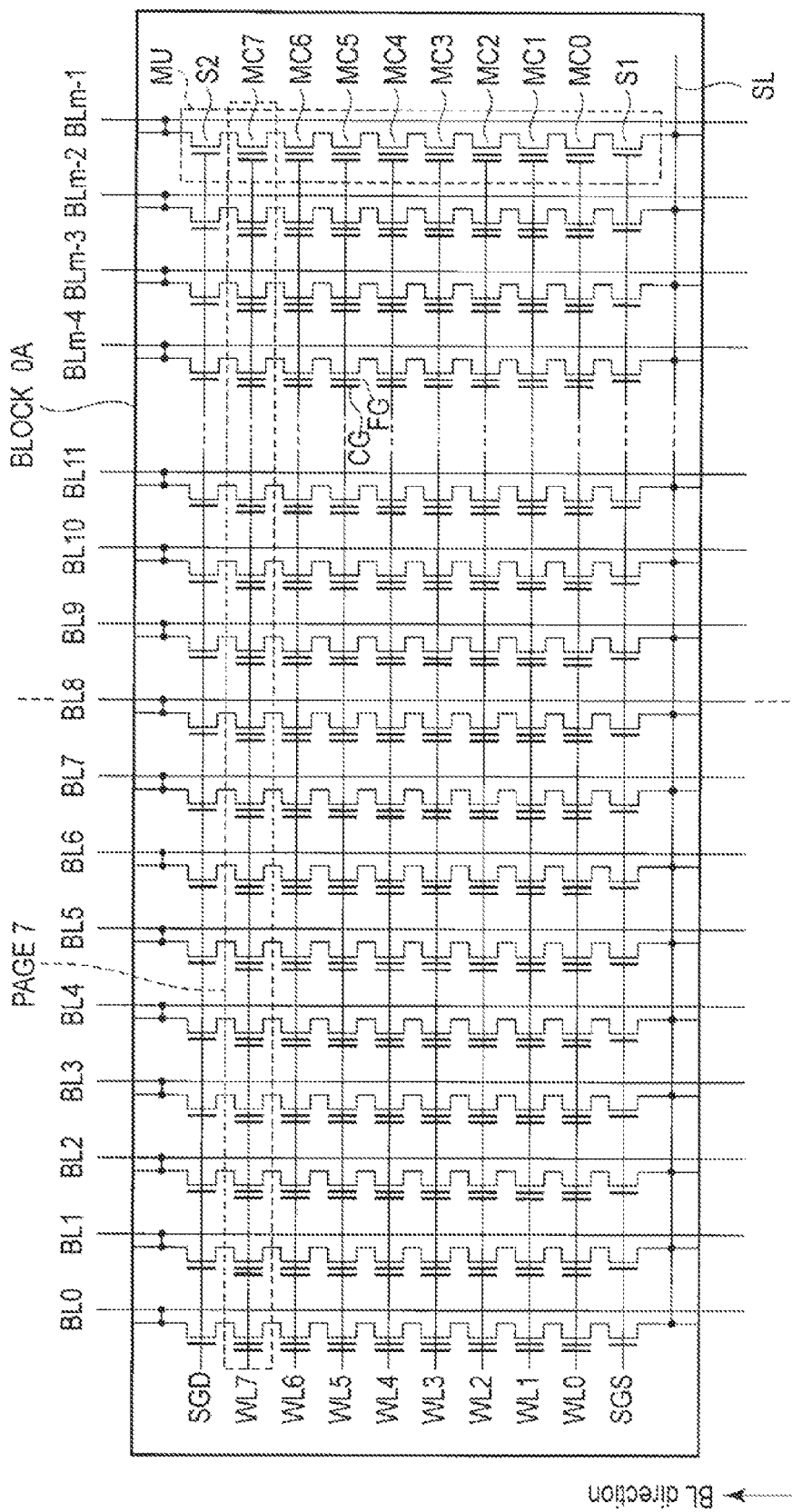
F I G. 4

Translation table L2P (embodiment)

| SC1 | LBA-T | PBA-T |
|---|---|---|
| D11 | CH0, P0, Pos 0 | PBA-D11 |
| ⋮ | ⋮ | |
| De1 | CH1, P2, Pos 3 | PBA-De1 |
| ⋮ | ⋮ | |

F I G. 7

Table T1 (First embodiment)

| Channel (CH0~CH3) | Pos (0~3) |
|---|---|
| 0 | 0 |
| 0 | 1 |
| 0 | 2 |
| 0 | 3 |
| 1 | 0 |
| 1 | 1 |
| 1 | 2 |
| 1 | 3 |
| 2 | 0 |
| 2 | 1 |
| 2 | 2 |
| 2 | 3 |
| 3 | 0 |
| 3 | 1 |
| 3 | 2 |
| 3 | 3 |

FIG. 8

Sector configuration (First embodiment)

Address identification flow (First embodiment (Translating unit 131))

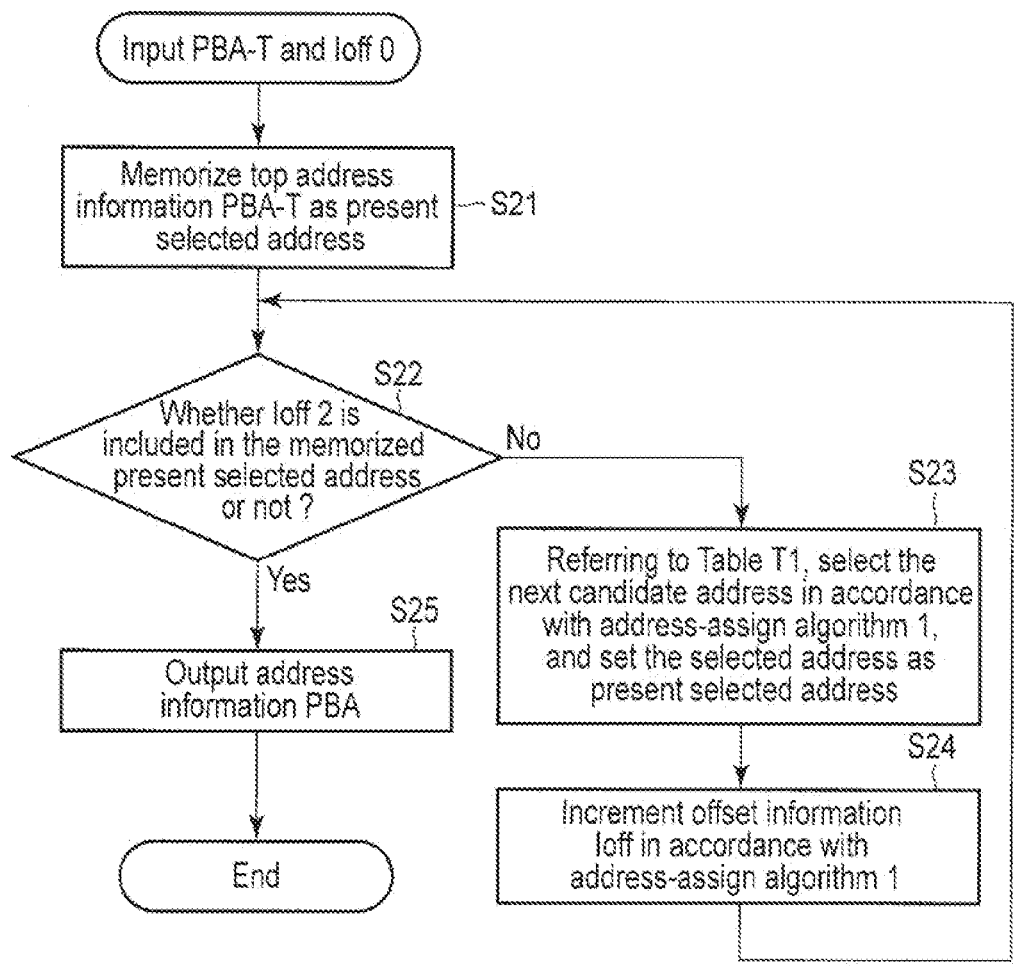
F I G. 12

Translation table (Comparative example)

| SC1~SC2 | LBA | PBA |
|---|---|---|
| D11 | CH0, P0, Pos 0 | PBA-D11 |
| D12 | CH0, P0, Pos 1 | PBA-D12 |
| ⋮ | ⋮ | |
| De1 | CH1, P2, Pos 3 | PBA-De1 |
| De2 | CH2, P2, Pos 0 | PBA-De2 |
| ⋮ | ⋮ | |

F I G. 13

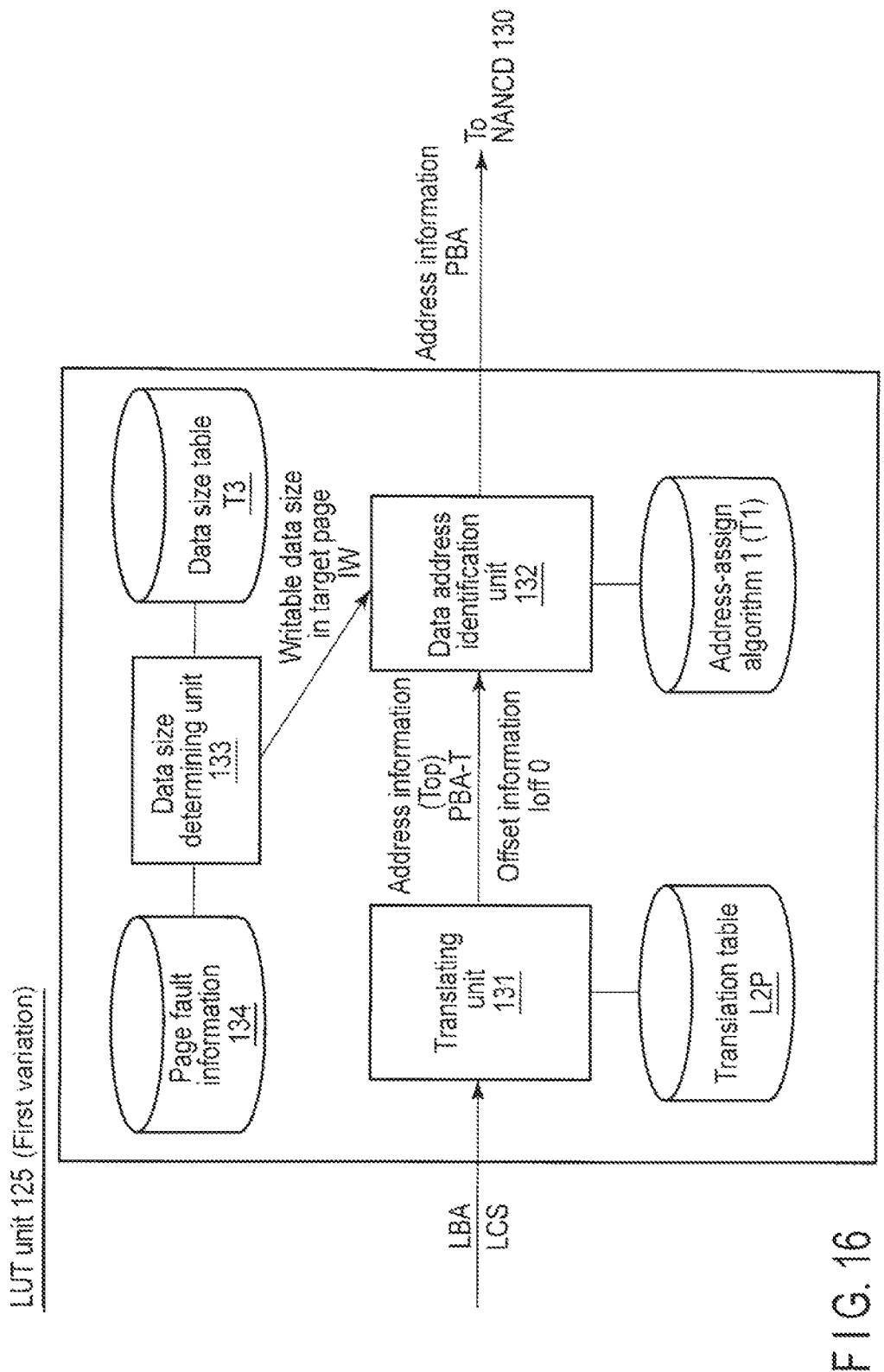
F I G. 16

Table T2 (Second embodiment)

| Channel (CH0~CH3) | Pos (0~3) |
|---|---|
| 0 | 0 |
| 1 | 0 |
| 2 | 0 |
| 3 | 0 |
| 0 | 1 |
| 1 | 1 |
| 2 | 1 |
| 3 | 1 |
| 0 | 2 |
| 1 | 2 |
| 2 | 2 |
| 3 | 2 |
| 0 | 3 |
| 1 | 3 |
| 2 | 3 |
| 3 | 3 |

F I G. 20

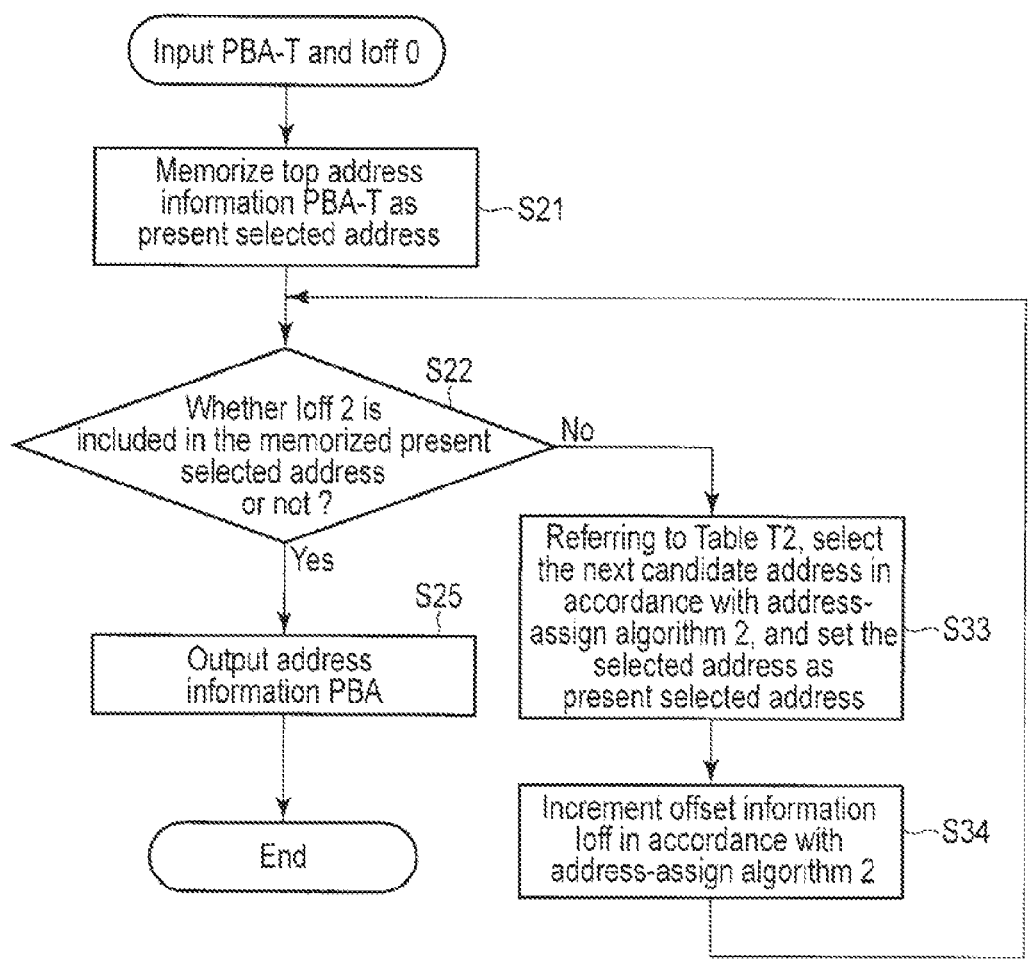
F I G. 22

MEMORY DEVICE AND STORAGE SYSTEM HAVING THE SAME

CROSS-REFERENCE TO RELATED APPLICATION

This application is based upon and claims the benefit of priority from the U.S. Provisional Patent Application No. 62/079,051, filed Nov. 13, 2014, the entire contents of which are incorporated herein by reference.

FIELD

Embodiments relate generally to a memory device and a storage system having the same.

BACKGROUND

A memory device of one type includes a nonvolatile semiconductor memory as storage media and has an interface that is the same as the one for a magnetic storage unit, such as a hard disc drive (HDD). The nonvolatile semiconductor memory includes, for example, a solid state drive (SSD).

BRIEF DESCRIPTION OF THE DRAWINGS

FIG. 2 is a block diagram of the memory device according to the first embodiment.

FIG. 4 is an equivalent circuit diagram of a block in the NAND memory illustrated in FIG. 3.

FIG. 7 is a translation table L2P stored in the memory device according to the first embodiment.

FIG. 8 is table T1 stored in the memory device according to the first embodiment.

FIG. 12 is a flow chart of address-identify operation carried out by an address identification unit of the memory device according to the first embodiment.

FIG. 13 is a translation table stored in a memory device according to a comparative example.

FIG. 16 is a block diagram showing an LUT unit in a memory device according to a variation of the first embodiment.

FIG. 20 is table T2 stored in the memory device according to the second embodiment.

FIG. 22 is a flow chart showing address-identify operation carried out by an address identification unit of the memory device according to the second embodiment.

DETAILED DESCRIPTION

Various embodiments will be described hereinafter with reference to the accompanying drawings.

In this specification, more than two terms are used for some components. These terms are merely examples, and those components may be expressed by other terms. Furthermore, components which are expressed by only one term may be expressed by other terms. Also, the appended drawings are schematic ones, in which the relationship between the thickness and the planar dimension, and/or the ratio in thickness between each layers may differ from an actual device. Further, the relationship and/or the ratio in dimension may vary between the drawings.

According to one embodiment, a memory device includes a nonvolatile memory and a memory controller. The memory controller is configured to receive an access command with respect to a cluster of the nonvolatile memory, the access command including a size of the cluster and a logical address corresponding to a part of the cluster, translate the logical address to a physical address in the nonvolatile memory, by referring to a table storing physical addresses corresponding to part of logical addresses of the nonvolatile memory, identify all physical addresses corresponding to the cluster, based on the size of the cluster, the translated physical address, and an algorithm that generates a sequence for accessing the nonvolatile memory, and access the cluster of the nonvolatile memory in accordance with the identified physical addresses.

First Embodiment

1. Structure

1-1. Storage System

Figure 1:
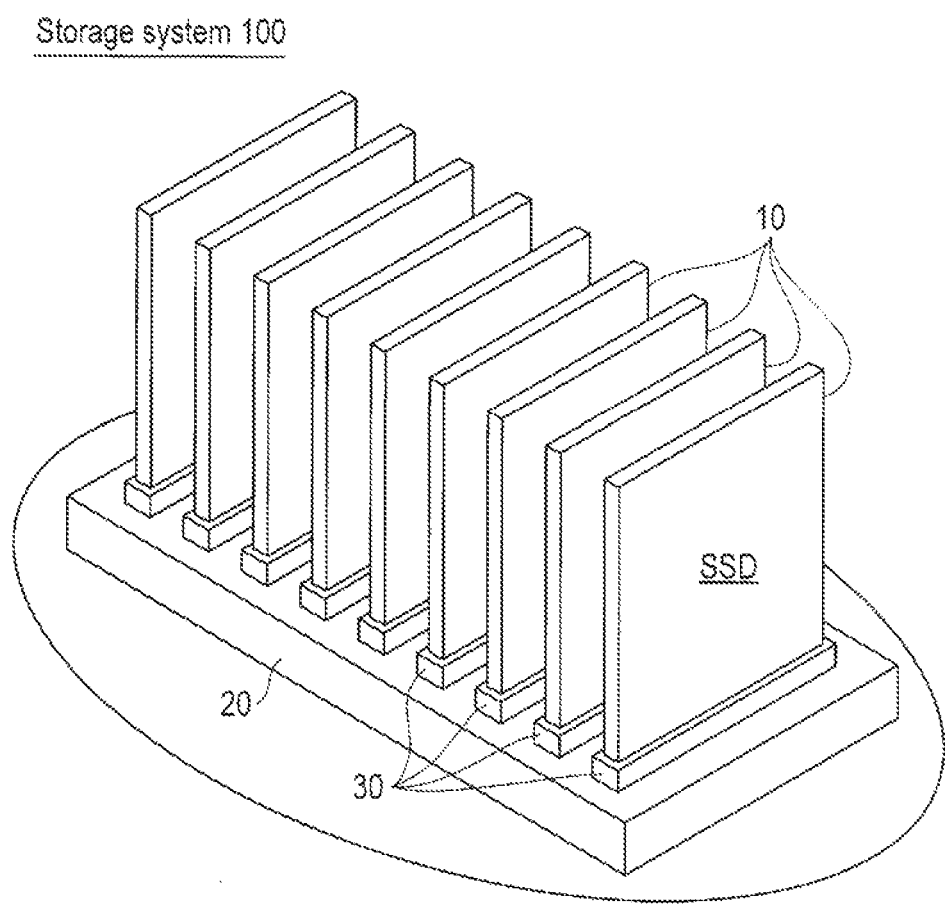
FIG. 1 is a perspective view of a storage system including a memory device according to the first embodiment.

First, before describing memory devices according to each embodiment, referring to FIG. 1, a storage system 100 including a memory device 10 according to this embodiment is described. In this embodiment, the storage system 100 uses a plurality of SSDs (solid state drives) as an example of the memory device 10.

The SSDs 10 according to this embodiment are, for example, relatively small modules, and their outer size in one instance is approximately 20 mm×30 mm. Note that the size of the SSDs 10 is not limited to the above, and may be changed in a wide range.

In addition, each SSD 10 may be mounted to a server-like host device 20 in, for example, a data center or a cloud computing system operated in a company (enterprise). Thus, each SSD 10 according to this embodiment may be an enterprise SSD (eSSD) used in a server (or a PC), for example.

The host device 20 comprises a plurality of connectors (e.g., slots) 30 which are opened upward, for example. Each connector 30 is, for example, a Serial Attached SCSI (SAS) connector. The SAS connector enables the host device 20 and each SSD 10 to perform high-speed communication with each other utilizing a 6-Gbps dual port. Meanwhile, each connector 30 is not limited to the above, and may be, for example, PCI express (PCIe) or NVM express (NVMe).

Further, the SSDs 10 are mounted to the connectors 30 of the host device 20, respectively, and supported side by side with each other in standing position in substantially vertical direction. This structure enables a plurality of SSDs 10 to be compactly mounted together, and to downsize the host device 20. Furthermore, each SSD 10 according to this embodiment is a 2.5 inch SFF (small form factor). Such a shape allows the SSD 10 to be compatible with an enterprise HDD (eHDD) in shape and achieves an easy system compatibility with an eHDD.

Note that, the SSDs 10 are not limited to enterprise ones. For example, the SSD 10 is applicable as a storage medium of a consumer electronic device such as a notebook portable computer and a tablet device.

1-2. Memory System

Second, referring to FIG. 2, memory device 10 according to the first embodiment is described. As shown in FIG. 2, the memory device (SSD) 10 according to the first embodiment includes a nonvolatile memory 11 and an SSD controller 12.

The nonvolatile memory (memory unit) 11 stores predetermined data, in a non-volatile manner, on the basis of control of the SSD controller 12 using four channels (CH0-CH3). In this instance, the nonvolatile memory 11 includes, for example, two NAND type flash memories (hereinafter 'NAND memories') 11A and 11B.

The SSD controller (controller) 12 controls the NAND memories 11 on the basis of requests (such as a write command) transmitted from the host 20, which is the outside of the SSD 10, logical address LBA, and data etc. The SSD controller 12 includes a front end 12F and a back end 12B.

The front end (first interface) 12F receives predetermined commands (such as a write command and a read command) transmitted from the host 20, logical address LBA, and data, and analyzes the predetermined commands. Further, the front end 12F requests the back end 12B to read or write user data, on the basis of the analysis result of the commands.

The back end (second interface) 12B executes garbage collection on the basis of the data write request from and the operational state of the NAND memory 11, etc. and writes the user data transmitted from the host 20 into the NAND memory 11. Also, the back end 12B reads the user data from the NAND memory 11 on the basis of the data read request. In addition, the back end 12 erases the user data from the NAND memory 11 on the basis of the data erase request.

The NAND memories 11 and the SSD controller 12 will hereinafter be described in detail.

1-3. NAND Memory 11

Figure 3:
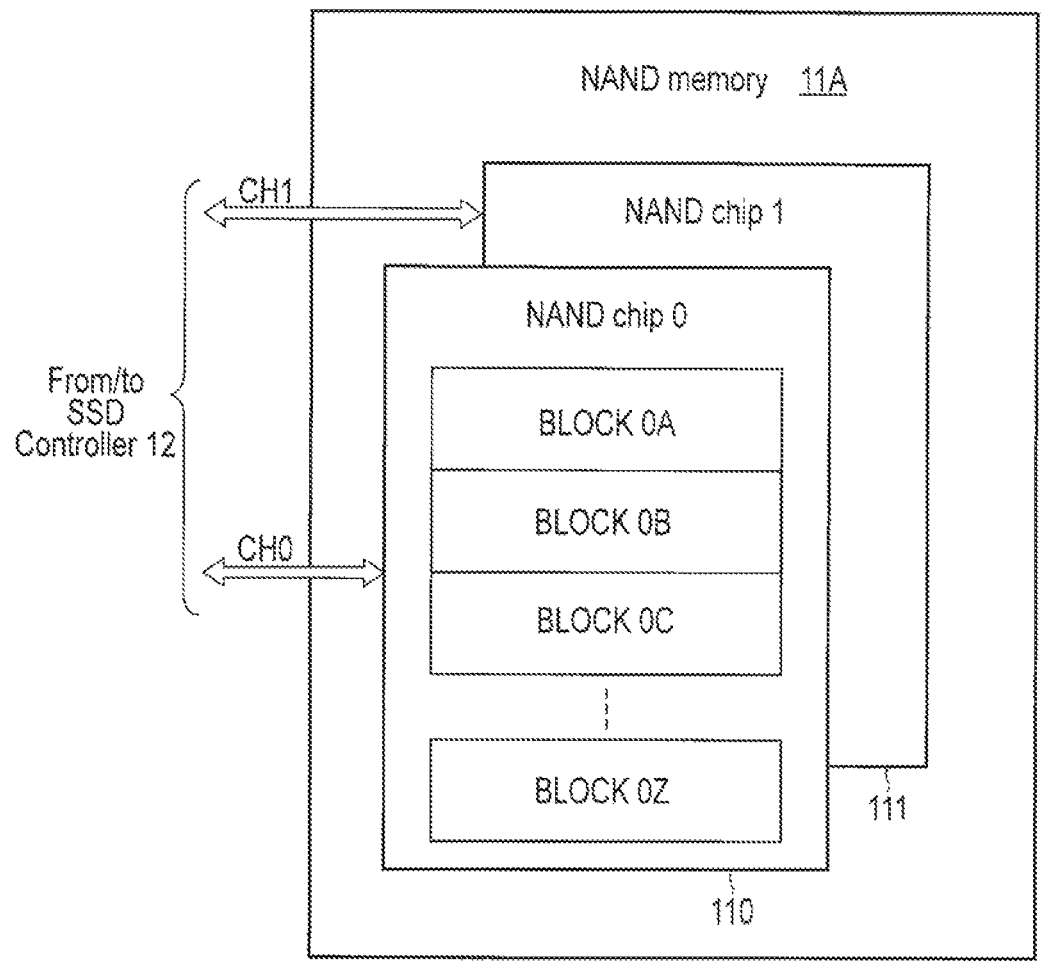
FIG. 3 is a block diagram of an NAND memory of the memory device illustrated in FIG. 2.

Next, referring to FIG. 3 and FIG. 4, the NAND memories 11 included in the memory device 10 according to the first embodiment is described in detail. NAND memory 11A in FIG. 2 is one example.

[NAND Memory 11A]

As shown in FIG. 3, an NAND memory 11A, in this instance, includes two NAND chips (NAND chip 0 and NAND chip 1).

The two NAND chips are controlled by the back end 12B of the SSD controller 12 using two corresponding channels (CH0 and CH1). For example, the NAND chip 0 is controlled by the back end 12B using the corresponding channel CH0.

Further, each NAND chip includes a plurality of blocks (physical blocks). For example, the NAND chip 0 includes a plurality of blocks (BLOCK 0A-BLOCK 0Z). The NAND chip 1 also includes a plurality of blocks (BLOCK 1A-BLOCK 1Z (omitted in the figure)).

NAND memory 11B (omitted in the figure) has the same configuration as the NAND memory 11A. The NAND memory 11B includes two NAND chips (NAND chip 2 and NAND chip 3). Each NAND chip of the NAND memory 11B is controlled by the back end 12B of the SSD controller 12 using two corresponding channels (CH2 and CH3). The NAND chip 2 includes a plurality of blocks (BLOCK 2A-BLOCK 2Z), and the NAND chip 3 includes a plurality of blocks (BLOCK 3A-BLOCK 3Z).

Each of the NAND memories 11A and 11B includes two NAND chips here as one example; however, the number of NAND chips in a single NAND memory is not limited. Each of the NAND memories 11A and 11B may include only one NAND chip, four NAND chips, or any other numbers of NAND chips.

[Physical Block (BLOCK 0A)]

Next, configuration of physical blocks is described. In this instance, a physical block (BLOCK 0A) included in the NAND chip 0 is described as an example. The physical block (BLOCK 0A) is shown in FIG. 4.

The physical block (BLOCK 0A) is configured with a plurality of memory cell units MU which are arranged along the direction of word lines (WL direction). The memory cell units MU extend in parallel to the direction of bit lines (WL direction) intersecting the word lines, and each includes a NAND string (memory cell string) including eight memory cells MC0-MC7 of which the current pathway is connected in series, a select transistor S1, on the source side, connected to one end of the NAND string current pathway, and a select transistor S2, on the drain side, connected to the other end of the NAND string current pathway. The memory cells MC0-MC7 include control gates CG and floating gates FG. In this instance, a memory cell unit MU includes eight memory cells MC0-MC7, but the number of memory cells in a single memory cell unit MU is not limited to eight. A memory cell unit MU may include more than two memory cells, for example, 56 or 32 memory cells.

The other ends of the current pathways of the select transistors S1, on the source side, are connected to the source line SL in common, and the other ends of the current pathways of the select transistors S2, on the drain side, are connected to one of the bit lines BL0-MLm-1. Each of the word lines WL0-WL7 is connected to the control gates CG of a plurality of the memory cells arranged in WL direction. A select gate line SGS is connected to gate electrodes of a plurality of the select transistors S1 in WL direction. A select gate line SGD is also connected to gate electrodes of a plurality of the select transistors S2 in WL direction.

Further, a page (PAGE) is allocated for each word line WL0-WL7. For example, as shown with a marking in a broken line, page 7 (PAGE7) is allocated for the word line WL7. In units of the pages, the data read/data write operations are executed. Therefore, a page (PAGE) is a data read/data write unit.

Note that data erase is executed in a physical block (BLOCK 0A) collectively. Therefore, a physical block is a data erase unit.

1-4. SSD Controller

Figure 5:
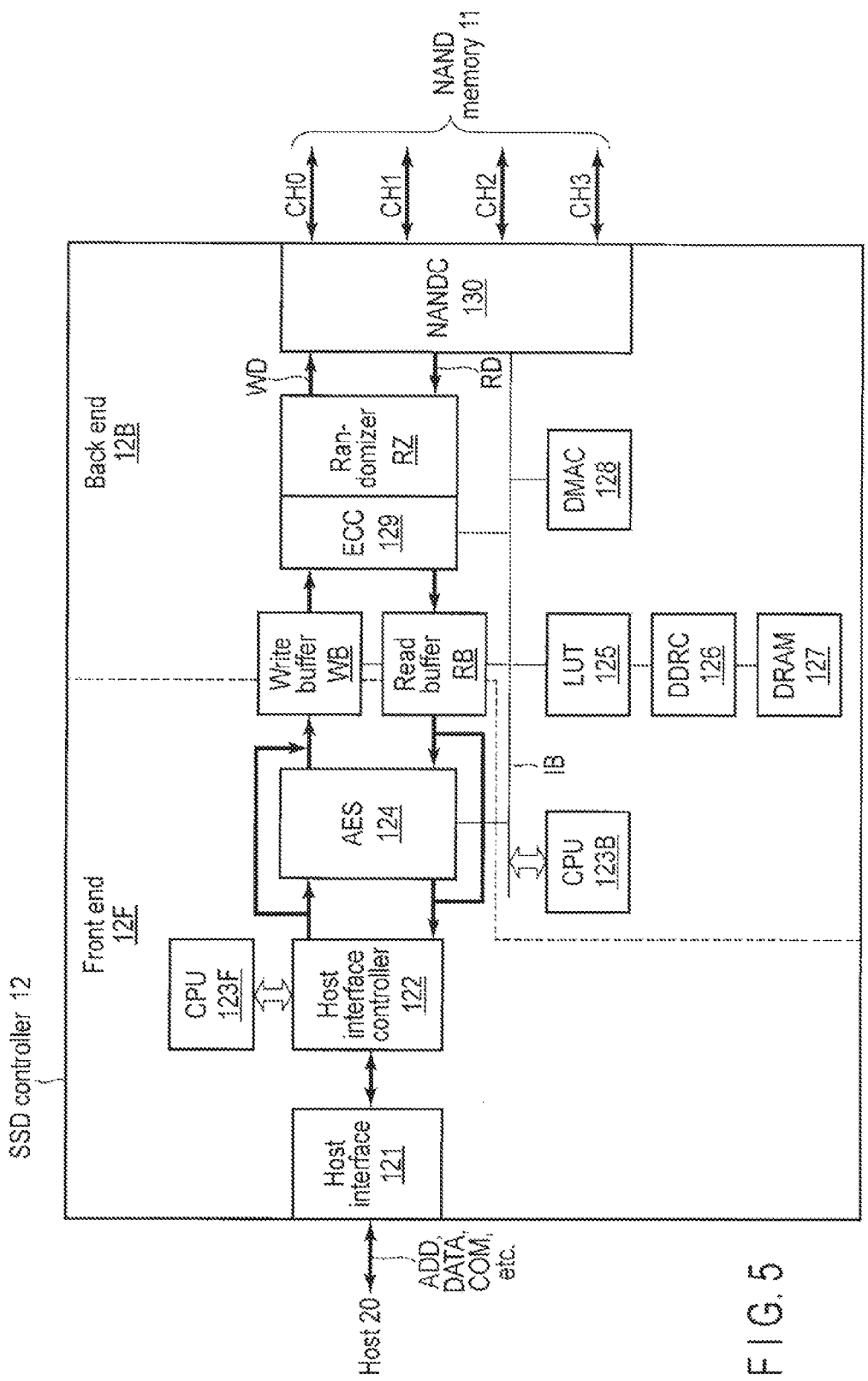
FIG. 5 is a block diagram of an SSD controller in the memory device according to the first embodiment.

Next, referring to FIG. 5, the SSD controller 12 according to the first embodiment is described. As shown in FIG. 5, the SSD controller 12 includes the front end 12F and the back end 12B.

[Front End 12F]

The front end (host communicator) 12F includes a host interface 121, a host interface controller 122, encrypt/decrypt unit 124, and CPU 123F.

The host interface 121 communicates requests (write command, read command, erase command, etc.), logical address LBA, and data, etc. with the host 20.

The host interface controller 122 controls the communication of the host interface 121, in accordance with control by the CUP 123F.

The encrypt/decrypt unit (Advanced Encryption Standard (AES)) 124 encrypts write data (plain text) transmitted from the host interface controller 122, during a data write operation. The encrypt/decrypt unit 124 decrypts encrypted read data transmitted from a read buffer RB of the back end 12B, during a data read operation. Note that the write/read data can be transmitted without involving the encrypt/decrypt unit 124 as needed.

The CPU 123F controls each component of the front end 12F (121-124) and the entire operation by the front end 12F.

[Back End 12B]

The back end (memory communicator) 12B includes a write buffer WB, a read buffer RB, LUT unit 125, DDRC 126, DRAM 127, DMAC 128, ECC 129, a randomizer RZ, NANDC 130, and CUP 123B.

The write buffer (write data transmitter) WB temporarily stores write data WD transmitted from the host 20. To be more precise, the write buffer WB temporarily stores write data WD until it fits predetermined data size which is suitable for the NAND memory 11. For example, in a case where a page size PS is 16 KB, the write buffer WB temporarily stores data until the data is divided into four clusters of 4 KB data size (4 KB×4=16 KB).

The read buffer (read data transmitter) RB temporarily stores read data RD which was read out from the NAND memory 11. To be more precise, the read data RD is stored, until it is rearranged into an order which is expedient for the host 20 (an order of logical address LBA assigned by the host 20) in the read buffer RB.

The LTU unit (look-up table, translating unit) 125 translates the logical address LBA transmitted from the host 20 into a predetermined physical address PBA by utilizing a predetermined translation table and etc., which is not shown in FIG. 5. Further details about the LUT unit 125 will be described below.

The DDRC 126 controls DDR (Double Data Rate) in DRAM 127.

The DRAM (Dynamic Random Access Memory) 127 is used as a work area, for example, in storing the translation table of the LUT unit 125, and is a volatile memory which stores predetermined data in a volatile manner.

DMAC 128 transmits write/read data etc. through an internal bus IB. In FIG. 5, there is only one DMAC 128; however, the number of the DMAC 128 is not limited. More than one DMAC 128 can be placed anywhere in the SSD controller 12 as needed.

The ECC (error correct unit) 129 adds ECC (Error Correcting Code) to write data WD transmitted from the write buffer WB. When the ECC 129 transmits read data RD to the read buffer RB, it corrects read data RD read out from the NAND memory 11 as needed, utilizing the added ECC.

In order to keep write data WD from being concentrated to specific pages or along word line direction, etc. of the NAND memory 11, the randomizer (Scrambler) RZ disperse write data WD, during the data write operation. As just described, by dispersing the write data WD, write frequency of each memory cell MC can be more uniform, and it enables to extend operating life of the memory cells MCs of the NAND memory 11. Therefore, reliability of the NAND memory 11 can be improved. Read data RD read out from the NAND memory 11 also passes through the randomizer RZ during the data read operation.

The NANDC (data write/read unit) 130 accesses the NAND memory 11 in parallel by utilizing a plurality of the channels (in this instance, four channels CH0-CH3) in order to meet a predetermined processing speed requirement.

The CUP 123B controls each component of the back end 12B (125-130), and the entire operation by the back end 12B.

Note that the configuration of SSD controller 12 shown in FIG. 5 is only an example, and the configuration is not limited to this example.

1-5. LUT Unit

Figure 6:
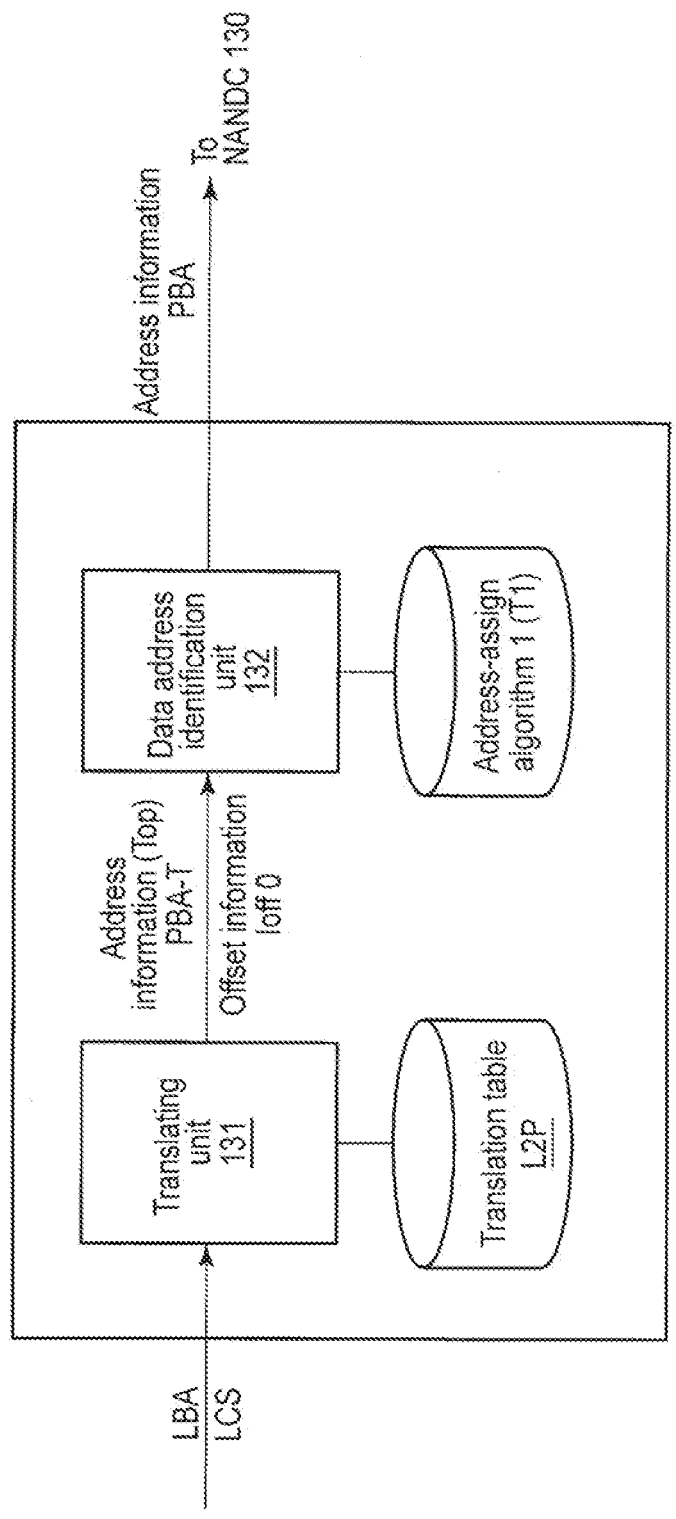
FIG. 6 is a block diagram of an LUT unit in the memory device according to the first embodiment.

Next, referring to FIG. 6-FIG. 8, the LUT unit 125 according to the first embodiment is described.

As shown in FIG. 6, the LUT unit 125 according to the first embodiment includes a translation table L2P, a translating unit 131, an address-assign algorithm 1, and data address identification unit 132. The LUT unit 125 identifies the physical address PBA, which is the desired address information, based on logical address LBA and the size of large clusters LCS transmitted from the host 20, utilizing the above configuration.

[Translation Table L2P]

The translation table (look-up table, mapping table, logical address/physical address translation table) L2P is shown in FIG. 7.

As shown in FIG. 7, the translation table L2P according to the first embodiment shows addresses in the NAND memory 11 (physical addresses), which correspond to logical addresses among all logical addresses LBA assigned by the host 20. To be more precise, in the present embodiment, the translation table L2P shows a logical block address LBA-T of the small cluster SC1, which is the top of the small clusters SC1-SC3 configuring a large cluster LC1, and corresponding top address information (PBA-T (the top physical block address)) in the NAND memory 11.

For example, the logical block address LBA-T (CH0, P0, Pos0) of data D11, which is the top small cluster SC1 of the small clusters SC1-SC3 configuring the large cluster LC1, and a corresponding top physical block address PBA-T (PBA-D11) in the NAND memory 11 are shown in the translation table L2P. Likewise, the logical block address LBA-T (CH1, P2, Pos3) of data De1, which is the top small cluster SCel of the small clusters SCel-SCe3 configuring the large cluster LCe, and a corresponding physical block address PBA-T (PBA-De1) in the NAND memory 11 are shown in the translation table L2P.

In this instance, a logical block address LBA-T of the top small cluster SC1 and a corresponding physical block address PBA-T are shown in the same row. However, in practice, a logical block address LBA-T and a corresponding physical block address PBA-T may not be shown in the same row. Therefore, a logical block address LBA-T and a corresponding physical block address PBA-T may be arranged at random in the translation table L2P.

Furthermore, contents of the translation table L2P is not limited to the above example. For example, in the translation table L2P, a logical block address LBA-2 of a middle small cluster SC2 among the small clusters SC1-SC3 configuring a large cluster LC and corresponding middle physical information (PBA-2) in the NAND memory 11 may be shown. Further details about the address layout of large clusters LC will be described below.

In the above configuration, the translating unit 131 in FIG. 6 translates a portion of logical addresses LBA into a portion of address information in the NAND memory 11, referring to the translation table L2P. In the present embodiment, the translating unit 131 translates the top logical block address LBA-T into the top physical block address PBA-T in the NAND memory 11, referring to the translation table L2P. In addition, the translating unit 131 transmits offset information (Ioff 0) corresponding to the translated top address information PBA-T to the data address identification unit 132.

The address-assign algorithm 1, in this instance, is executed by table T1 showing the address-assign algorithm 1. The address-assign algorithm 1 is related to data addresses of each small sector arranged in data write operation to the NAND memory 11 prior to data read operation. Therefore, the address-assign algorithm 1 of the executed data write operation is stored by the LUT unit 125 as table T1 in the address-assign algorithm 1. Further details about the address-assign algorithm 1 (T1) will be described below.

The data address identification unit (identifier) 132 identifies the remaining address information PBA configuring the large cluster LC on the basis of the input address information PBA-T and the offset information (Ioff 0) in accordance with the address-assign algorithm 1 (T1) in data read operation, and obtain them. Then, the data address identification unit 132 transmits the all obtained address information PBA to the NANDC 130.

Further, the NANDC 130 reads out the desired read data RD from the NAND memory 11, on the basis of the transmitted address information (physical block addresses).

[Table T1]

Next, referring to FIG. 8, table T1 for executing the address-assign algorithm is described. As shown, in table T1, each channel CH0-CH3 and the cluster addresses Pos0-Pos3 of each page are shown in pairs. Note that table T1 is common in all pages.

By utilizing table T1, data write starts from page 0 of channel 0 (CH0) in units of small clusters SC. The data write operation will continue until the all cluster addresses Pos0-Pos3 of channel 0 (CH0) are done. When the page (page 0) of channel 0 is filled with data, data write operation moves onto the same page, page 0, of the next channel, channel 1 (CH1), likewise, in units of small clusters SC. Subsequently, when pages 0 of the all 4 channels (CH0-CH3) are filled with data, a series of data is written onto the next page, page 1, of channel 0 sequentially. As described, when execution of the address-assign algorithm 1 has come to the end of table T1, data write operation restarts from the top of table T1 and the same data address-assign operation is repeated on the next page in units of small clusters SC.

As shown in table T1, the address-assign algorithm 1 is manifested preliminarily, before starting the data write operation preceding the data read operation.

Therefore, as shown in FIG. 7, in the translation table L2P according to the first embodiment, only the top logical block address LBA-T of small cluster SC1 configuring a large cluster LC and a corresponding top physical block address PBA-T are shown, even when managing data in units of large clusters LC, as described below.

This is because, once at least a portion (top address (PBA-T)) of the small clusters SC is identified, all addresses (physical address: PBA) of the remaining small clusters SC configuring the large cluster LC can be identified utilizing table T1 showing the address-assign algorithm 1.

Further details will be described below when describing address-identify operation.

1-6. Large Cluster Address Layout

Figure 9:
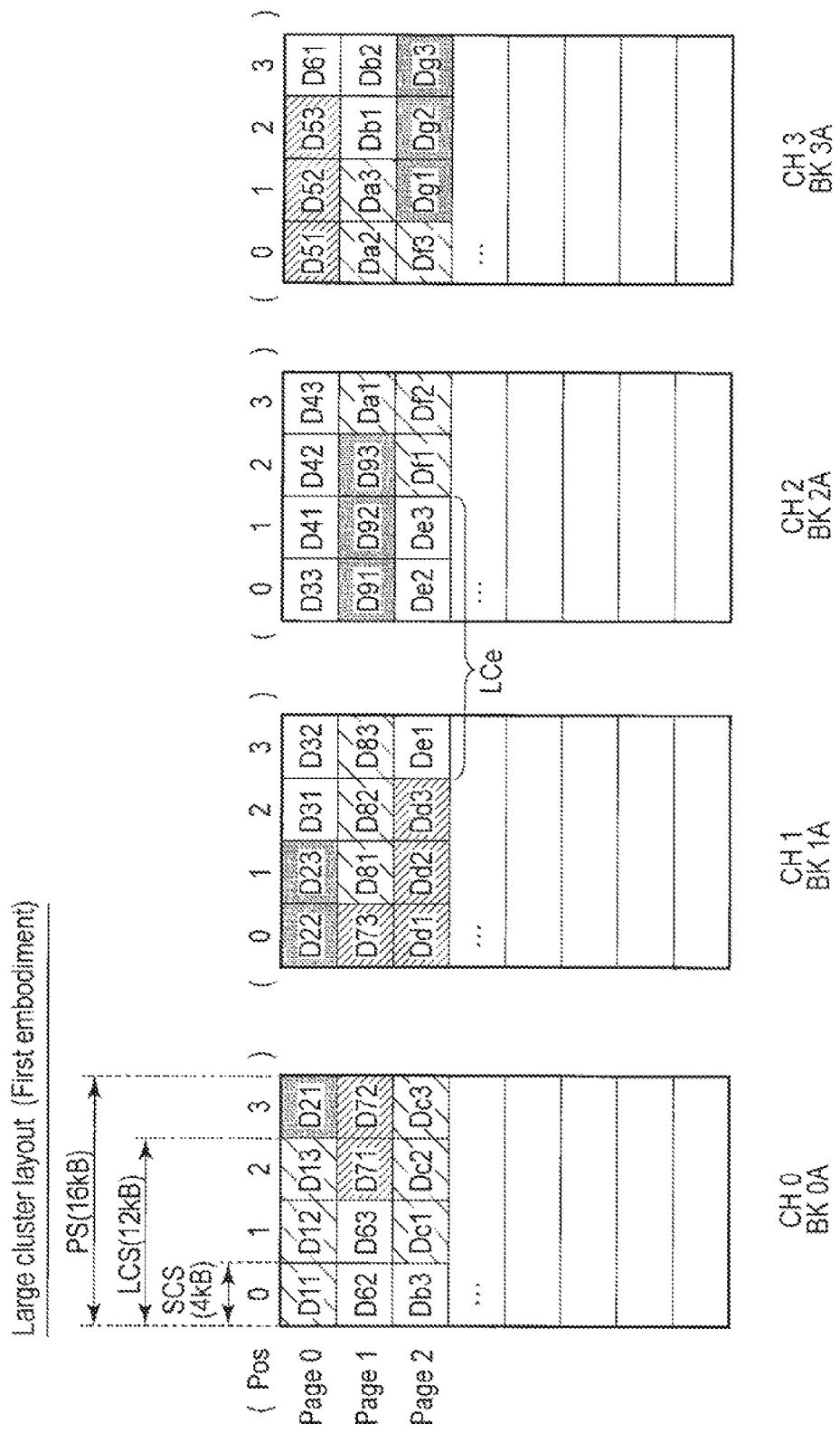
FIG. 9 shows a large cluster layout according to the first embodiment.

Next, referring to FIG. 9, a data address layout of large clusters LC according to the first embodiment, which is based on the address-assign algorithm 1 executed according to the above-described table T1, is described.

[Cluster Size and Logical Block]

First, the relationship between cluster size (large cluster size LCS) and blocks shown in FIG. 9 is described. In this instance, logical blocks (BK0A-BK3A) in memory spaces of the logical addresses LBA managed by the host 20 are shown. The logical blocks (BK0A-BK3A) correspond to the channels CH0-CH3, respectively.

As shown in FIG. 9, in the present embodiment, the logical blocks are configured on the presupposition that large cluster size LCS is the size of management unit (hereinafter referred to as 'cluster size') in the NAND memory 11. For example, in the case of the present embodiment, the cluster size (large cluster size) LCS is 12 KB. This means that cluster size LCS uses three quarters (¾) of a page when the page size PS of the NAND memory 11 is 16 KB. In other words, in the present embodiment, the cluster size LCS is three times as large as an ordinary cluster size (small cluster size) SCS (4 KB).

Therefore, large clusters LC include three small clusters SC1-SC3. For example, in logical block BK0A of channel CH0, one large cluster LC1 includes three small clusters, data D11, D12, and D13.

In the large cluster address layout, logical blocks BK0A-BK3A are assigned to, respectively, the channels CH0-CH3 which are the parallel-write units in the data write operation.

A sector configuration of the small cluster SC will be described below.

[Address-assign Algorithm 1]

By utilizing the above-described large cluster LC layout and the address-assign algorithm 1 utilizing table T1, write data (D11, D12, ... Dg3, ... ) are arranged into each logical block BK0A-BK3A as shown in FIG. 9.

To be more precise, on page 0 of block BK0A with channel CH0, the data write operation is executed in units of small clusters SC, and will continue until all data D11, D12, D13, and D21 in cluster addresses (Pos0-Pos3) are done.

When the page 0 of block BK0A with channel 0 is filled with data, data write operation moves onto the same page, page 0, of the next channel, channel CH1, likewise. To be more precise, on page 0 of block BK1A with channel CH1, data D22, D23, D31, D32 in cluster addresses (Pos0-Pos3) are written, in units of small clusters SC.

The same applies hereafter. In accordance with the address-assign algorithm 1, a series of data is written to logical blocks BK0A-BK3A sequentially, in units of small clusters SC.

[Sector Configuration]

Figure 10:
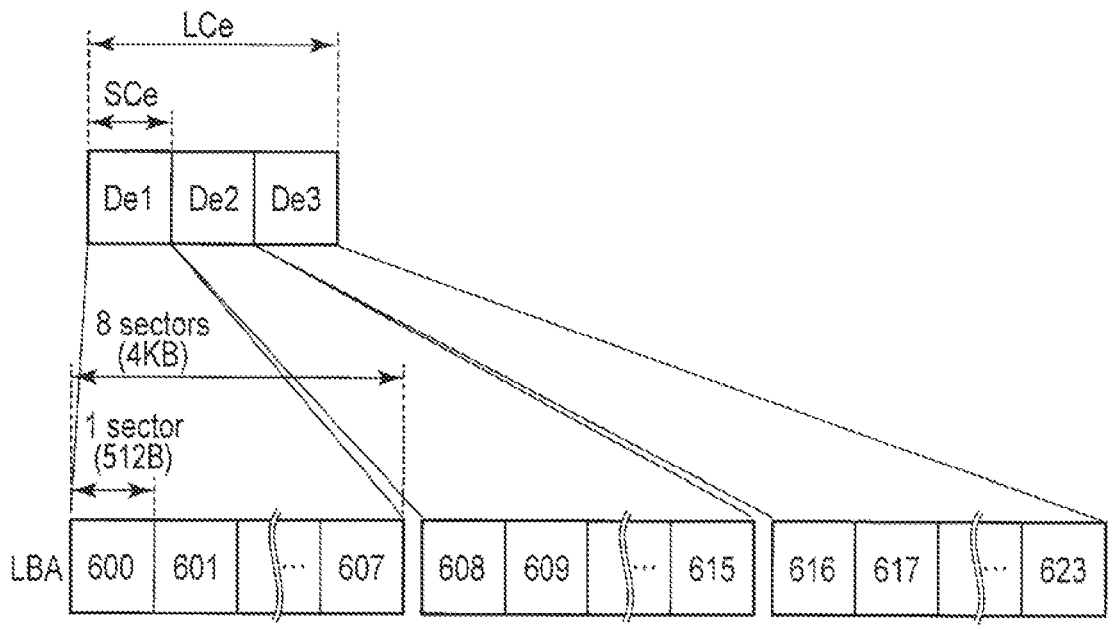
FIG. 10 shows a sector configuration the large cluster.

Next, referring to FIG. 10, sectors composing small clusters SC is described briefly. In FIG. 10, three pieces of data De1-De3, which are small clusters SCe, respectively, and collectively configure a large cluster LCe shown in FIG. 9, are described as one example.

In the present specification, a large cluster LC refers to an aggregate (cluster) of data that includes a plurality of small clusters SC. A small cluster SC refers to the smallest unit of data address management in a memory space of logical addresses in the memory device (SSD) 10. In this regard, the data size of the small clusters SC is never larger than the data size PS of pages.

As shown in FIG. 10, the large cluster LCe includes three small clusters SCe (De1-De3).

Small cluster data De1-De3 each includes eight sectors and each of which has a data size of 512 B. For example, data De1 includes eight sectors of which logical addresses are 600-607. Data De2 includes eight sectors of which logical addresses are 608-615. Data De3 includes eight sectors of which logical addresses are 616-623.

2. Operations 2-1. Address-Identify Operation (Translating Unit)

Figure 11:
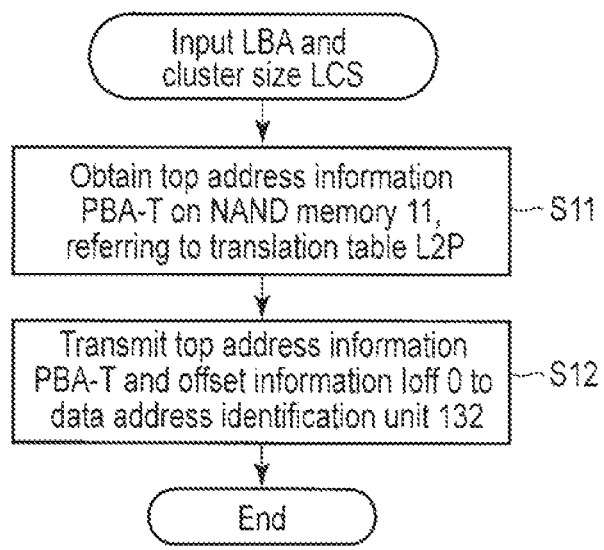
FIG. 11 is a flow chart of address-identify operation carried out by a translating unit of the memory device according to the first embodiment.

Next, referring to FIG. 11, an address-identify operation carried out by the translating unit 131 according to the first embodiment in the above-described configuration is described.

As shown in FIG. 11, the translating unit 131 starts the address-identify operation when a logical address LBA and a cluster size LCS are input.

In step S11, the translating unit 131 refers to the translation table L2P, and obtains a top address information PBA-T in the NAND memory 11 on the basis of the input logical address LBA-T etc. For example, when reading data De1-De3 configuring the large cluster LCe shown in FIG. 10, the translating unit 131 refers to the translation table L2P and translates the input logical address LBA-T (CH1, P2, Pos3) into a corresponding physical address PBA-T (PBA-De1). In this regard, there is no need for the translating unit 131 to translate the remaining data De2 and De3 of the large cluster LCe into physical addresses.

In step 12, the translating unit 131 transmits the translated PBA-T and corresponding offset information Ioff to the data address identification unit 132. For example, when reading data De1-De3 of the large cluster LCe, the translating unit 131 transmits the translated physical address PBA-T of data De1 (PBA-De1) and offset information Ioff 0, corresponding to the top address PBA-T, to the data address identification unit 132.

2-2. Address-Identify Operation (Address Identification Unit)

Next, referring to FIG. 12, address-identify operation by the address identification unit 132 according to the first embodiment is described.

As shown in FIG. 12, the address identification unit 132 starts the address-identify operation when the top address information PBA-T and the offset information Ioff 0 are input from the translating unit 131.

In step S21, the address identification unit 132 memorizes the top address information PBA-T as a present selected address. For example, when reading data De1-De3 of the large cluster LCe, the address identification unit 132 memorizes the input top physical address PBA-T (PBA-De1) and the offset information Ioff 0 as the present selected address.

In step S22, the address identification unit 132 compares the last offset information Ioff 2 based on cluster size LCS (in this instance, LCS0-2), which was input to LUT unit 125, with the input top offset information Ioff 0. Then, on the basis of the comparison result, the address identification unit 132 determines whether or not the last offset information Ioff 2 is included in (or matches to) the memorized offset information Ioff 0 of the present selected address. For example, in case of the top cluster data De1, the address identification unit 132 compares the last offset information Ioff 2 with the memorized offset information Ioff 0. Then, on the basis of the comparison result, if the address identification unit 132 determines that the last offset information Ioff 2 is not included in the memorized offset information Ioff 0, then the process moves to step S23.

When the address identification unit 132 determines that the last offset information Ioff 2 is not included in the memorized offset information in step S22 (No in S22), moving to step S23, the address identification unit 132 refers to table T1, identifies the next candidate address in accordance with address-assign algorithm 1, and sets the identified address as the present selected address. For example, when identifying data De2 on the basis of data De1, the address identification unit 132 refers to table T1, and identifies the logical address LBA-2 (CH2, P2, Pos0) of the second data De2 on the basis of the top logical address LBA-T (CH1, P2, Pos3), in accordance with address-assign algorithm 1.

Then, the address identification unit 132 identifies a corresponding physical address PBA-2 (PBA-De2) on the basis of the above-identified logical address LBA-2 of the second data De2, likewise. Note that table T1 is common in all pages as stated above. Therefore, the address identification unit 132 only need to identify in the same page (in this instance, page 2 (P2)) unless the cluster address Pos comes to the end of table T1.

In step S24, the address identification unit 132 increments offset information Ioff. For example, in the case above, the address identification unit 132 increments offset information by one (Ioff 0 to Ioff 1).

Subsequently, going back to step S22, the same determination is executed. For example, in the case above, the address identification unit 132 determines whether or not the last offset information Ioff 2 is included in (or matches to) the memorized offset information Ioff 1 of the present selected address.

Hereafter, the same operation is repeated until the determination condition of step S22 is satisfied.

For example, when identifying the third data De3, in step S22, the address identification unit 132 compares the last offset information Ioff 2 with the memorized offset information Ioff 1. Then, on the basis of the comparison result, the address identification unit 132 determines whether or not the last offset information Ioff 2 is included in (or matches to) the memorized offset information Ioff 1 of the present selected address. For example, in case of the third cluster data De3, the address identification unit 132 compares the last offset information Ioff 2 with the memorized offset information Ioff 1. Then, on the basis of the comparison result, if the address identification unit 132 determines that the last offset information Ioff 2 is not included in the memorized offset information Ioff 1, then the process moves to step S23.

In step S23, the address identification unit 132 refers to table T1, and identifies the logical address LBA-3 (CH2, P2, Pos1) of the third data De3 on the basis of the second logical address LBA-2 (CH2, P2, Pos0) of the second data De2, in accordance with address-assign algorithm 1. Then, the address identification unit 132 identifies a corresponding physical address PBA-3 (PBA-De3) on the basis of the above-identified logical address LBA-3 (CH2, P2, Pos1) of the third data De3, likewise. In step S24, the address identification unit 132 increments offset information by one (Ioff 1 to Ioff 2).

Subsequently, again going back to step S22, the address identification unit 132 determines whether or not the last offset information Ioff 2 is included in (or matches to) the memorized offset information Ioff 2 of the present selected address.

When the determination condition of step S22 is satisfied (Yes in S22), moving onto step 25, the address identification unit 132 transmits the all desired address information PBA (physical block address PBA-De1 to PBA-De3) of the data De1-De3 of the large cluster LCe to NANDC 130, and ends the operation.

The NANDC 130 reads data from the NAND memory 11 in accordance with the all address information PBA of data De1-De3 of large cluster LCe, transmitted from the address identification unit 132. The data which was read out will be transmitted to the host 20 and the data read operation ends.

3. Advantageous Effects

As described above, by utilizing the configuration and operation according to the first embodiment, at least two effects (1) and (2) listed below are obtained.

(1) The data size of the translation table L2P can be reduced.

The above effect is described below by comparing the first embodiment with a comparative example.

A) In Case of a Comparative Example

When user data is stored in a NAND memory in accordance with a request from the host (in a data write operation), an SSD usually stores the user data every time in different addresses on the NAND memory.

Therefore, a translation table shown in FIG. 13, which shows the correspondence between logical block addresses LBA assigned by the host 20 and physical block addresses PBA which refers to the storage address on the NAND memory, is referred in order to clarify the correspondence relationship. However, the data size of the translation table increases inversely proportional to the size of management unit (cluster size). For example, the translation table according to the comparative example shows logical block addresses LBA ((CH0, P0, Pos0), (CH0, P0, Pos1)) of data D11-D12, which are small clusters SC1-SC2 of large cluster LC1 and corresponding all physical block addresses PBA (PBA-D11, PBA-D12) in the NAND memory. Therefore, the translation table according to the comparative example has a demerit that its data size increases.

In order to reduce the data size of the translation table, the cluster size should be enlarged. For example, when data is managed in larger in size than small cluster (managing in the size of large cluster), it is possible to manage data in the size of 8 KB or 16 KB.

However, if the size of the large cluster is larger than the size of a page in NAND memory, a portion of data configuring a cluster needs to be stored over a plurality of pages on the NAND memory when writing data. Therefore, when reading data, it is difficult to identify the address of the data in the NAND memory.

Figure 14:
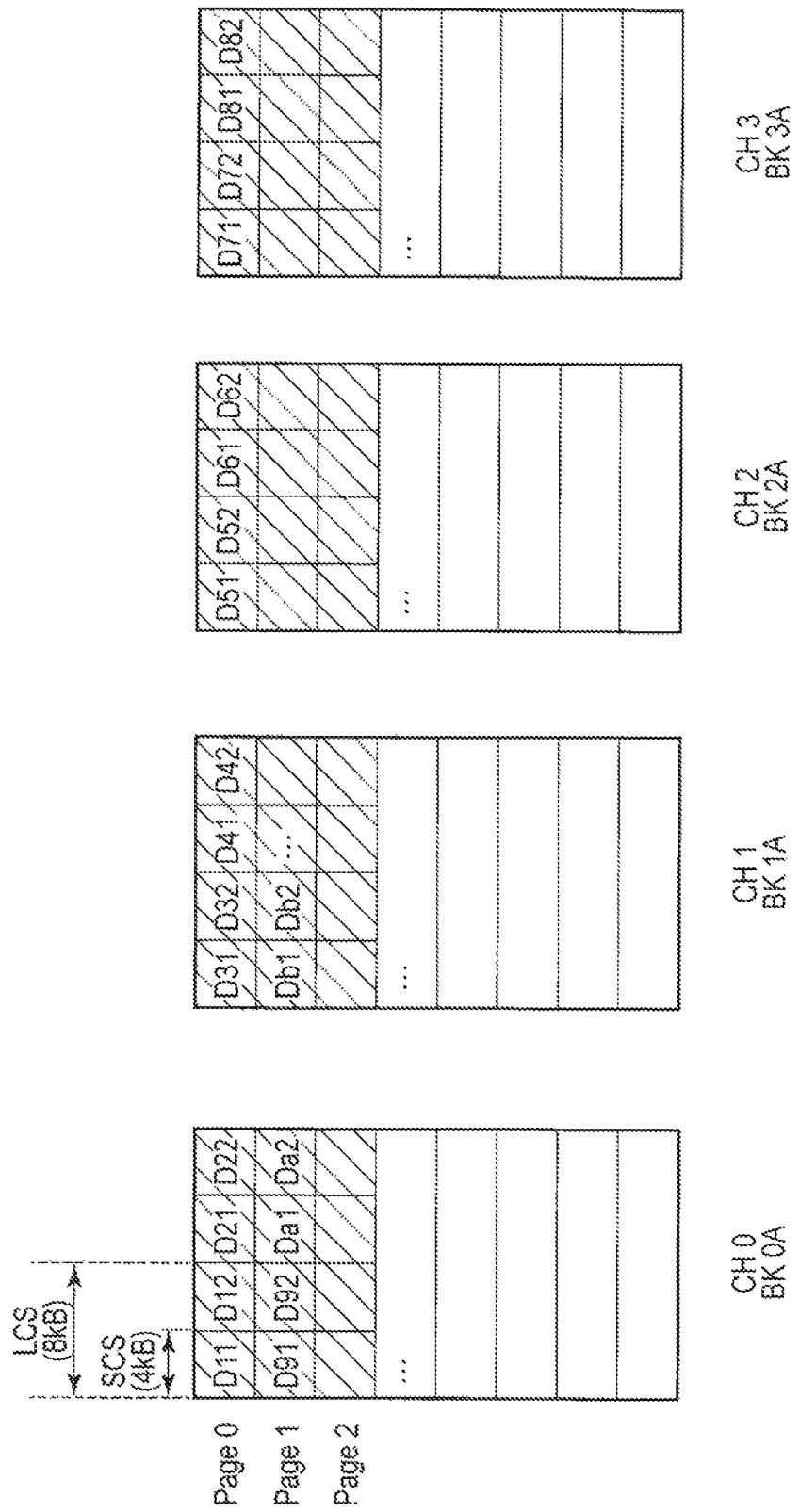
FIG. 14 shows a large cluster layout according to the comparative example.

For example, the large cluster layout according to the comparative example is shown in FIG. 14. FIG. 14 shows an example of layout where a large cluster LC (8 KB) includes two small clusters SC (4 KB each) in the comparative example. However, in such a data layout, a cluster of data needs to be arranged in the same page on the NAND memory. This is because it becomes difficult to identify the address of the data on the NAND memory when reading data, as described above, if the data is managed by utilizing large cluster address layout without a restriction by the page size. As a result, the memory device according to the comparative example has a demerit that data layout is restricted by the page size of NAND memory and loses flexibility when managed by utilizing large cluster addresses.

B) In Case of the First Embodiment

Comparing to the comparative example, the memory device 10 according to the first embodiment includes a translating unit 131 (shown in FIG. 6 and FIG. 7) which includes a translation table L2P showing a physical addresses in the NAND memory 11 corresponding to a portion of logical addresses among those logical addresses assigned by the host (outside) 20.

For example, as shown in FIG. 7, the translation table L2P shows a logical block address LBA-T of the small cluster SC1, which is the top of the small clusters SC1-SC3 configuring a large cluster LC, and corresponding top address information (PBA-T) in the NAND memory 11.

As just described, the translation table L2P according to the first embodiment only shows a portion of logical block addresses LBA-T among the small clusters SC1-SC3 configuring a large cluster LC and corresponding top address information (PBA-T) in the NAND memory 11. The remaining physical block addresses PBA of the small clusters SC2-SC3 can be identified by the identification unit 132.

As a result, in the memory device 10 according to the first embodiment, the data size of the translation table L2P can be reduced. For example, in the translation table L2P according to the first embodiment, the data size can be reduced to half (½), or to a quarter (¼), compared to the data size of the translation table according to the comparative example.

Note that contents of the translation table L2P is, of course, not limited to the above example. For example, in the translation table L2P, a logical block address LBA-2 of a middle small cluster SC2 among the small clusters SC1-SC3 configuring a large cluster LC and corresponding middle physical information (PBA-2) in the NAND memory 11 may be shown.

(2) Even when managing data by large cluster addresses, read data can be identified (2A). In addition, even with the large cluster address layout, the flexibility of data layout can be increased and data layout is not restricted by the page size of NAND memory (2B).

Furthermore, the memory device 10 according to the first embodiment includes the identification unit 132 (FIG. 6), which identifies data addresses in the NAND memory 11 corresponding to the all logical addresses assigned by the host (outside) 20, in accordance with address information PBA-T transmitted from the translating unit 131 and an address-assign algorithm 1 (T1) for writing data in the nonvolatile memories.

For example, when reading data De1-De3 configuring the large cluster LCe, the address identification unit 132 memorizes the input top physical address PBA-T (PBA-De1) as the present selected address (S21 in FIG. 12).

Figure 15:
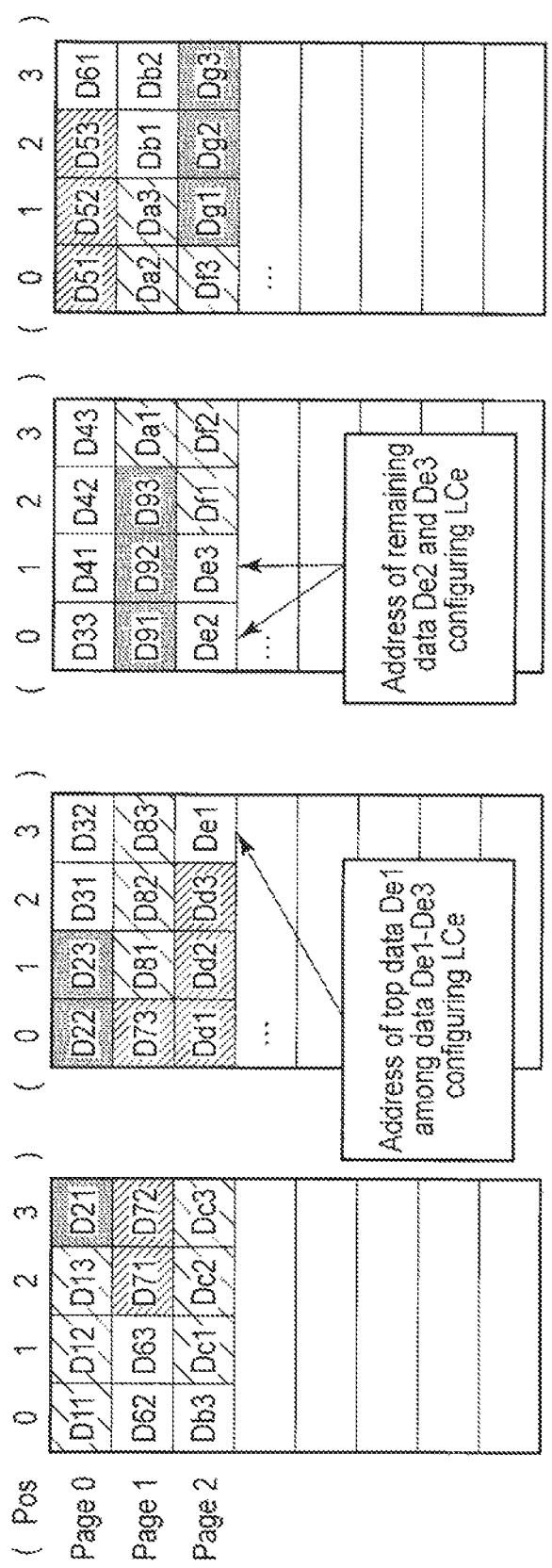
FIG. 15 shows address identification of the large cluster according to the first embodiment.

Then, as shown in FIG. 15, when identifying the second (middle) data De2 on the basis of the top data De1, the address identification unit 132 refers to table T1, and identifies the logical address LBA-2 (CH2, P2, Pos0) of the second data De2 on the basis of the top logical address LBA-T (CH1, P2, Pos3), in accordance with the address-assign algorithm 1 (S23 in FIG. 12). Subsequently, the address identification unit 132 identifies a corresponding physical address PBA-2 (PBA-De2) on the basis of the above-identified logical address LBA-2 (CH2, P2, Pos0) of the second data De2.

Likewise, when identifying the third (last) data De3 on the basis of the second data De2, the address identification unit 132 refers to table T1, and identifies the logical address LBA-3 (CH2, P2, Pos1) of the third data De3 on the basis of the second logical address LBA-2 (CH2, P2, Pos0), in accordance with the address-assign algorithm 1 (S23 in FIG. 12). Subsequently, the address identification unit 132 identifies a corresponding physical address PBA-3 (PBA-De3) on the basis of the above-identified logical address LBA-3 (CH2, P2, Pos1) of the third data De3.

As described, the address identification unit 132 can identify the all desired address information PBA (physical block address PBA-De1 to PBA-De3) of the data De1-De3 configuring the large cluster LCe.

Therefore, the memory device 10 according to the first embodiment can identify all address in the NAND memory when reading data, even when the data is managed by large cluster addresses.

In addition, the memory device 10 according to the first embodiment never has such a restriction that all small clusters SC1-SC3 configuring one large cluster need to be arranged on the same page in the NAND memory 11. Therefore, the memory device 10 according to the first embodiment has a merit that the flexibility of data layout can be increased and data layout is not restricted by the page size of NAND memory 11 even when the data is managed by large cluster addresses.

First Variation (An Example Utilizing Storable Data Size)

Figure 17:
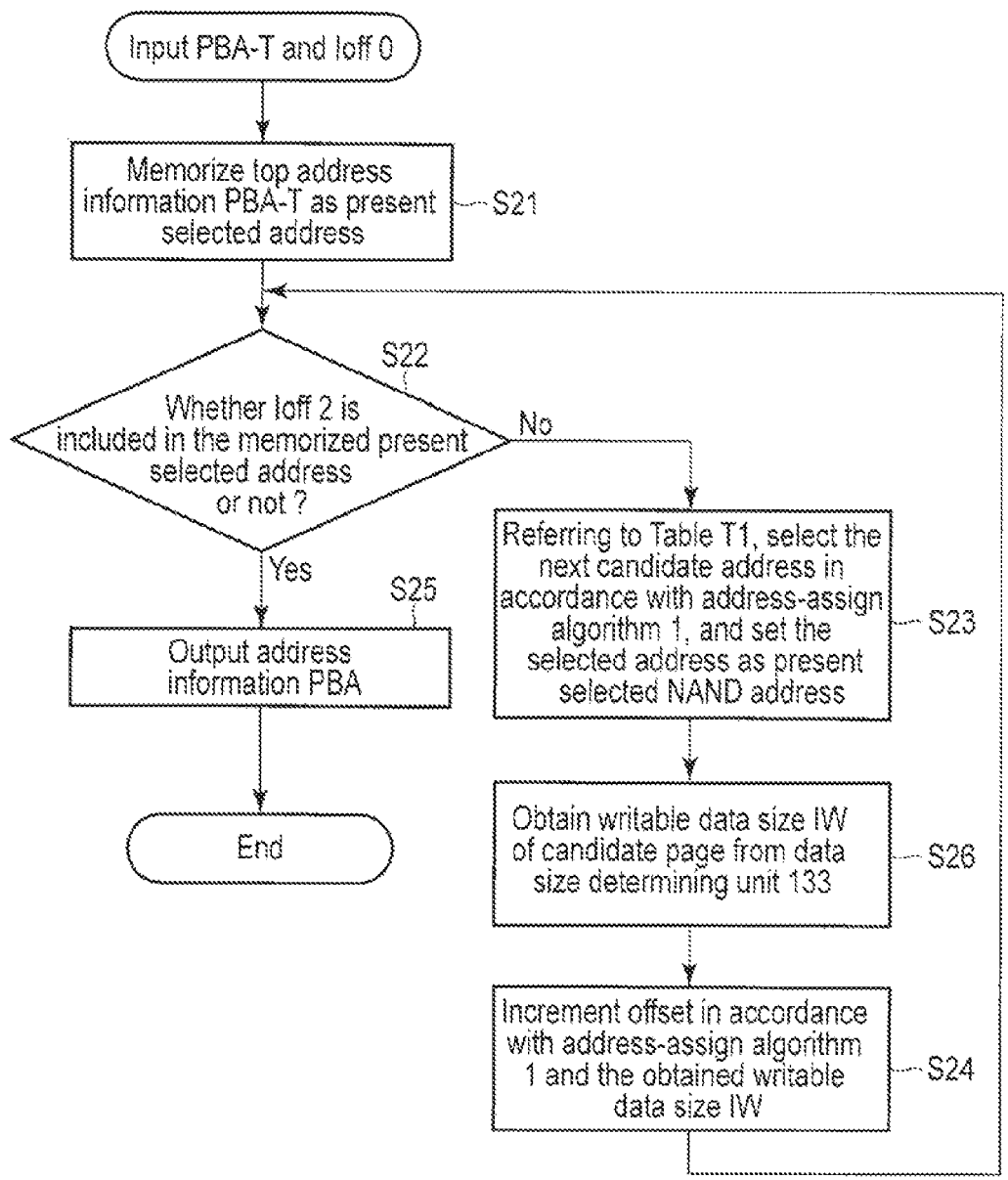
FIG. 17 is a flow chart showing address-identify operation carried out by the LUT unit according to the variation of the first embodiment.
Figure 18:
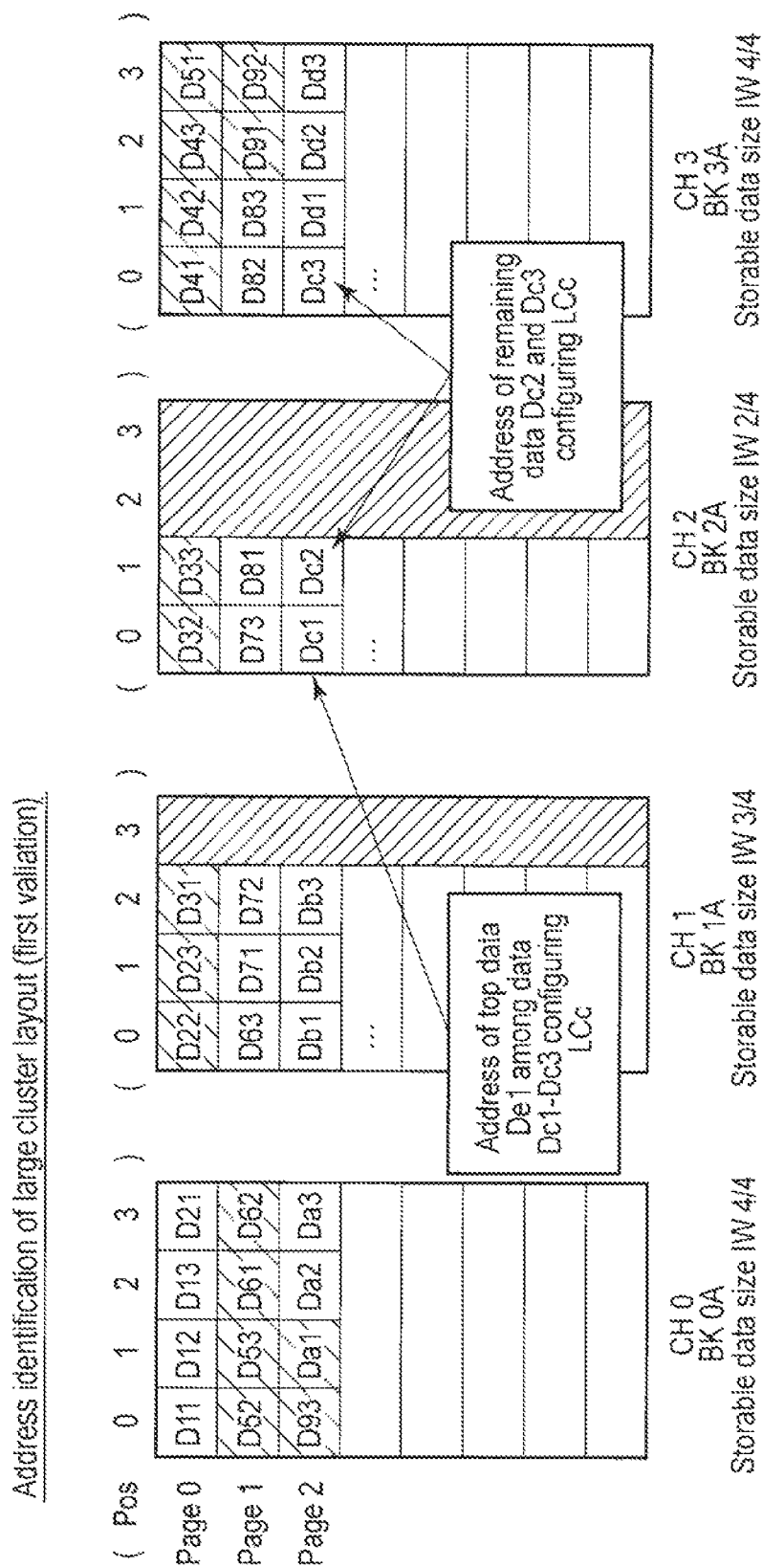
FIG. 18 shows address identification of a large cluster according to the variation.

Next, referring to FIG. 16-FIG. 18, a memory device 10 according to a first variation is described. The first variation is a modification example of the first embodiment. According to the first variation, the writable data size to each block is altered by utilizing ECC (hereafter referred to as 'variable-length ECC') which is capable of altering data size according to the degree of data fault in a block. To be more precise, in the first variation, information of 'data size storable in each page of each physical block' is used, in addition to the address-assign algorithm 1 for writing data, in order to estimate cluster data layout. In the following description, no detailed explanation of configurations and operations substantially overlapping to those of the first embodiment is given.

[LUT Unit]

As shown in FIG. 16, an LUT unit 125 according to the first variation differs from the one according to the first embodiment in that a data size determining unit 133, page fault information 134, and a data size table T3 are further included.

The data size determining unit 133 determines the writable data size IW in a target page in accordance with the information provided by the page fault information 134 and the data size table T3. Then, the data size determining unit 133 transmits the determined writable data size IW to the data address identification unit 132.

The data fault information 134 is information associated with data fault in each page of each block.

The data size table T3 shows the writable data size which fluctuates on the basis of the strength of variable-length ECC.

[Address-Identify Operation (LUT Unit)]

Next, referring to FIG. 17, an address-identify operation by the LUT unit according to the first variation is described.

As shown in FIG. 17, the address-identify operation according to the first variation differs from the first embodiment in that step S26 is further included.

In step S26, the data size determining unit 133 determines and obtains the writable data size IW in a target page in accordance with the information provided by the page fault information 134 and the data size table T3. The obtained determined writable data size IW is transmitted from the data size determining unit 133 to the data address identification unit 132.

Specifically, in the following step S24, the data address identification unit 132 identifies the address information PBA on the basis of the transmitted page writable data size IW in addition to the address-assign algorithm 1. Subsequently, the data address identification unit 132 increments offset information Ioff, likewise.

Since the other configurations and operations are substantially the same to those of the first embodiment, they are not described in detail.

Advantageous Effects

As described above, by utilizing the configuration and operation of the memory device 10 according to the first variation, at least the two effects (1) and (2) listed above are obtained. In addition, by utilizing the first variation, an effect (3) below is obtained.

(3) Flexibility in handling page fault in NAND memory 11 is achieved.

In case of utilizing the variable-length ECC, the storable data size of a page varies with the ECC strength of each physical block in the NAND memory 11. Data layout does not simply follow the algorithm for data write.

The memory device 10 according to the first variation further includes the data size determining unit 133, the page fault information 134, and the data size table T3. The data size determining unit 133 determines the writable data size IW in a target page in accordance with the information provided by the page fault information 134 and the data size table T3. The data size determining unit 133 transmits the determined writable data size IW to the data address identification unit 132 (S26 in FIG. 17).

The data address identification unit 132 identifies the address information PBA in accordance with the transmitted page writable data size IW in addition to the address-assign algorithm 1.

For example, the logical block address space according to the first variation is shown in FIG. 18. As shown in FIG. 18, since data fault degrees of blocks BK0A and BK3A with channel CH0 and CH3 are within a predetermined range, there is no need to increase the ECC strength, and the storable data size IW, which is the storable size of user data, is four-quarters (4/4). On the other hand, in blocks BK1A and BK2A with channel CH1 and CH2, the ECC strength is increased and each of the storable data size IW is reduced to three-quarters (3/4) and two-quarters (2/4).

The data address identification unit 132 identifies the data address PBA by utilizing the above information (storable data size IW) in addition to the address-assign algorithm 1. To be more precise, the data address identification unit 132 identifies the remaining data address on the basis of the size of already-stored data in a page, data size needed, and the storable data size IW of each page.

For example, when identifying the remaining data Dc2 and Dc3 on the basis of data Dc1 of the top small cluster configuring a large cluster LCc, the data address identification unit 132 identifies the address of the second data Dc2 on the basis of the top address information PBA-T (CH2, P2, Pos0). To be more precise, the data address identification unit 132 identifies the address information PBA-2 (CH2, P2, Pos1) of the second data Dc2 on the basis of the top address information PBA-T (CH2, P2, Pos0), data fault information, and information that the storable data size IW is 2/4.

Likewise, when identifying the third data Dc3, the data address identification unit 132 identifies the address information PBA-3 (CH3, P2, Pos0) of the third data Dc3 on the basis of the second address information PBA-2 (CH2, P2, Pos1), data fault information, and information that the storable data sizes IW are 2/4 and 4/4.

As described, in the first variation, a candidate address is determined in accordance with the basic address-assign algorithm 1, by units of switching addresses SC. In addition, in the first variation, whether the rest of a cluster data SC can be arranged in the page is determined on the basis of the page fault information and the data size information IW, all address information PBA of a cluster SC is determined sequentially, and then all address information PBA is determined.

Therefore, the first variation enables to handle page fault in NAND memory 11 with flexibility.

Note that the data size information is preferred to be separately established for each page. When the writable data size to a block is altered by the variable-length ECC, the writable data size information IW common to the all pages in units of physical blocks can be utilized. Entire page fault can be handled by setting the storable data size IW to zero (0).

Second Embodiment (An Example Utilizing Address-Assign Algorithm 2)

Next, referring to FIG. 19-FIG. 22, a memory device 10 according to the second embodiment is described. The second embodiment is an example utilizing an address-assign algorithm 2, which is different from the address-assign algorithm 1 according to the first embodiment. In the following description, no detailed explanation of configurations and operations substantially overlapping to those of the first embodiment is given.

[LUT Unit]

Figure 19:
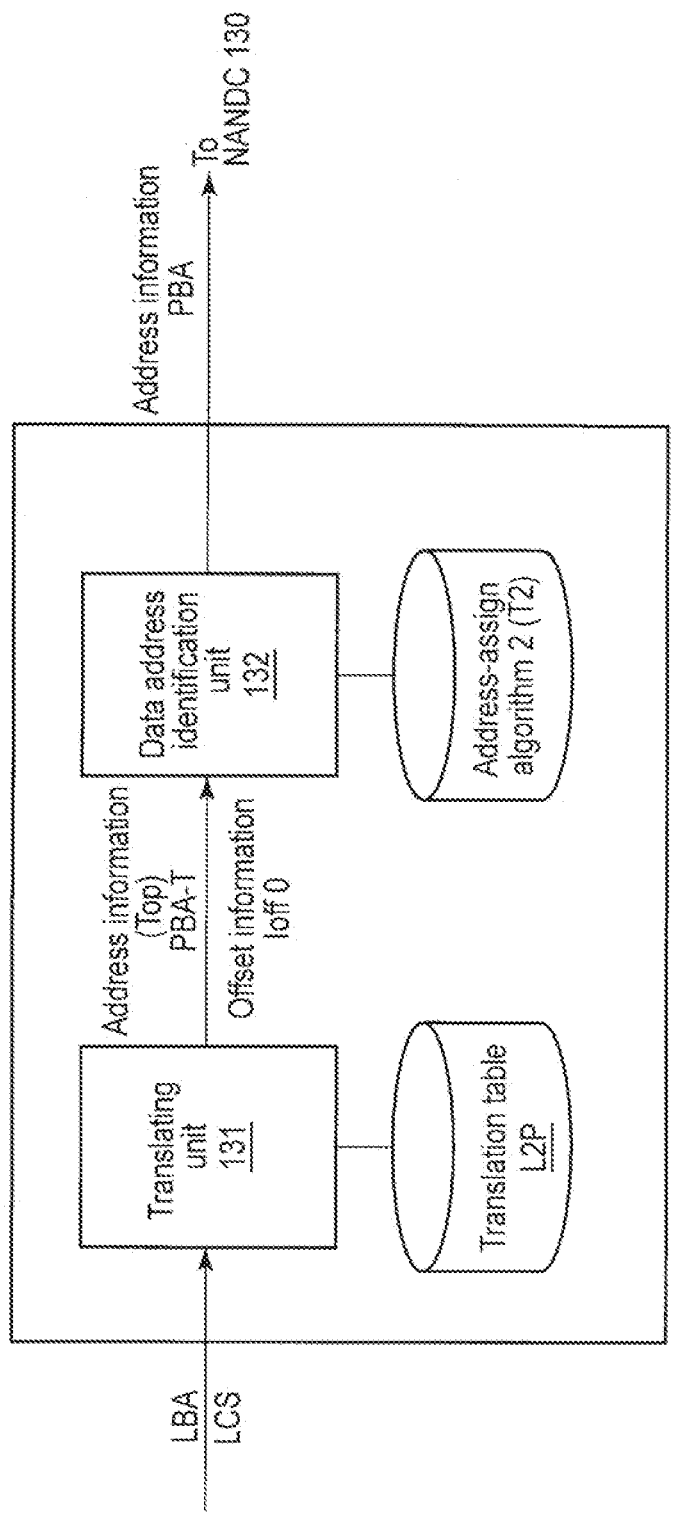
FIG. 19 is a block diagram showing an LUT unit in a memory device according to a second embodiment.

As shown in FIG. 19, an LUT unit 125 according to the second embodiment differs from the one according to the first embodiment in that table T2 for executing the address-assign algorithm 2 is further included.

[Table T2]

Table T2 is shown in FIG. 20. As shown FIG. 20, in the table T2, each channel CH0-CH3 and the cluster addresses Pos0-Pos3 of each page are shown in pairs. Note that the table T2 is common in all pages.

By utilizing the table T2, data write starts from cluster address Pos0 in page 0 of channel CH0 in units of small clusters SC. Subsequently, data is written into cluster address Pos0 in page 0 of channel CH1. Then, data is written into cluster address Pos0 in page 0 of channel CH2, and then CH3.

The same applies hereafter. The data write operation will continue until all pages of channels CH0-CH3 are done. When execution of the address-assign algorithm 2 has come to the end of table T2, the data write operation restarts from the top of the table T2 and the same data address-assign operation is repeated on the next page in units of small clusters SC.

[Large Cluster Address Layout (Address-Assign Algorithm 2)]

By utilizing the address-assign algorithm 2 executed according to the above-described table T2, write data (D11, D12, . . . Dg3, . . . ) are arranged into logical block address space in the NAND memory 11 as shown in FIG. 21.

Figure 21:
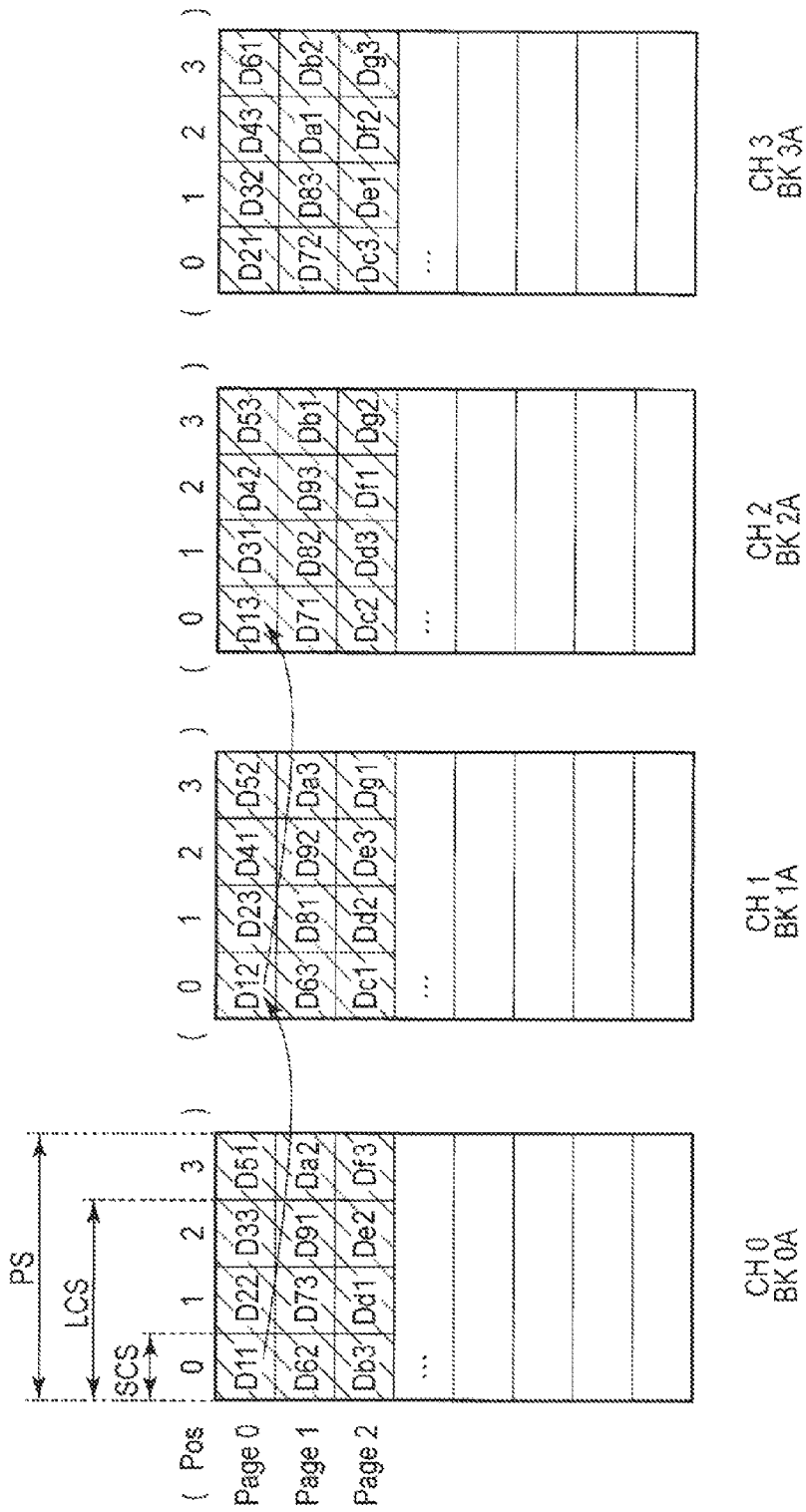
FIG. 21 shows a large cluster layout according to the second embodiment.

As shown in FIG. 21, at first, data D11 is written into cluster address Pos0 of page 0 in BK0A with channel CH0. Then, data D12 is written into cluster address Pos0 of page 0 in BK1A with channel CH1. Subsequently, data D13 is written into cluster address Pos0 of page 0 in BK2A with channel CH2.

The same applies hereafter. In accordance with the address-assign algorithm 2, a series of data is written onto logical blocks BK0A-BK3A sequentially, in units of small clusters SC.

[Address-Identify Operation (LUT Unit)]

Next, referring to FIG. 22, an address-identify operation by the LUT unit 125 according to the second embodiment is described.

As shown in FIG. 22, the address-identify operation according to the second embodiment differs from the first embodiment in that step S33 and S34 are further included.

In step S33, when the step S22 is No in S22, the address identification unit 132 refers to the table T2, identifies the next candidate address in accordance with address-assign algorithm 2, and sets the identified address as the present selected address. For example, when identifying data D12 on the basis of data D11, the address identification unit 132 refers to the table T2, and identifies the logical address LBA-2 (CH1, P0, Pos0) of the second data D12 on the basis of the top logical address LBA-T (CH0, P0, Pos0), in accordance with address-assign algorithm 2.

Subsequently, the address identification unit 132 identifies a corresponding physical address PBA-2 (PBA-D12) on the basis of the above-identified logical address LBA-2 (CH1, P0, Pos0) of the second data D12.

In step S34, the address identification unit 132 increments offset information Ioff. For example, in the case above, the address identification unit 132 increments offset information by one (Ioff 0 to Ioff 1).

Hereafter, the same operation is repeated until all address information PBA is identified.

Since the other configurations and operations are substantially the same to those of the first embodiment, they are not described in detail.

Advantageous Effects

As described above, by utilizing the configuration and operation of the memory device 10 according to the second embodiment, at least the two effects (1) and (2) listed above are obtained. In addition, as shown by using the example of the second embodiment, various algorithms can be utilized as needed.

Second Variation (An Example Utilizing Storable Data Size)

Figure 23:
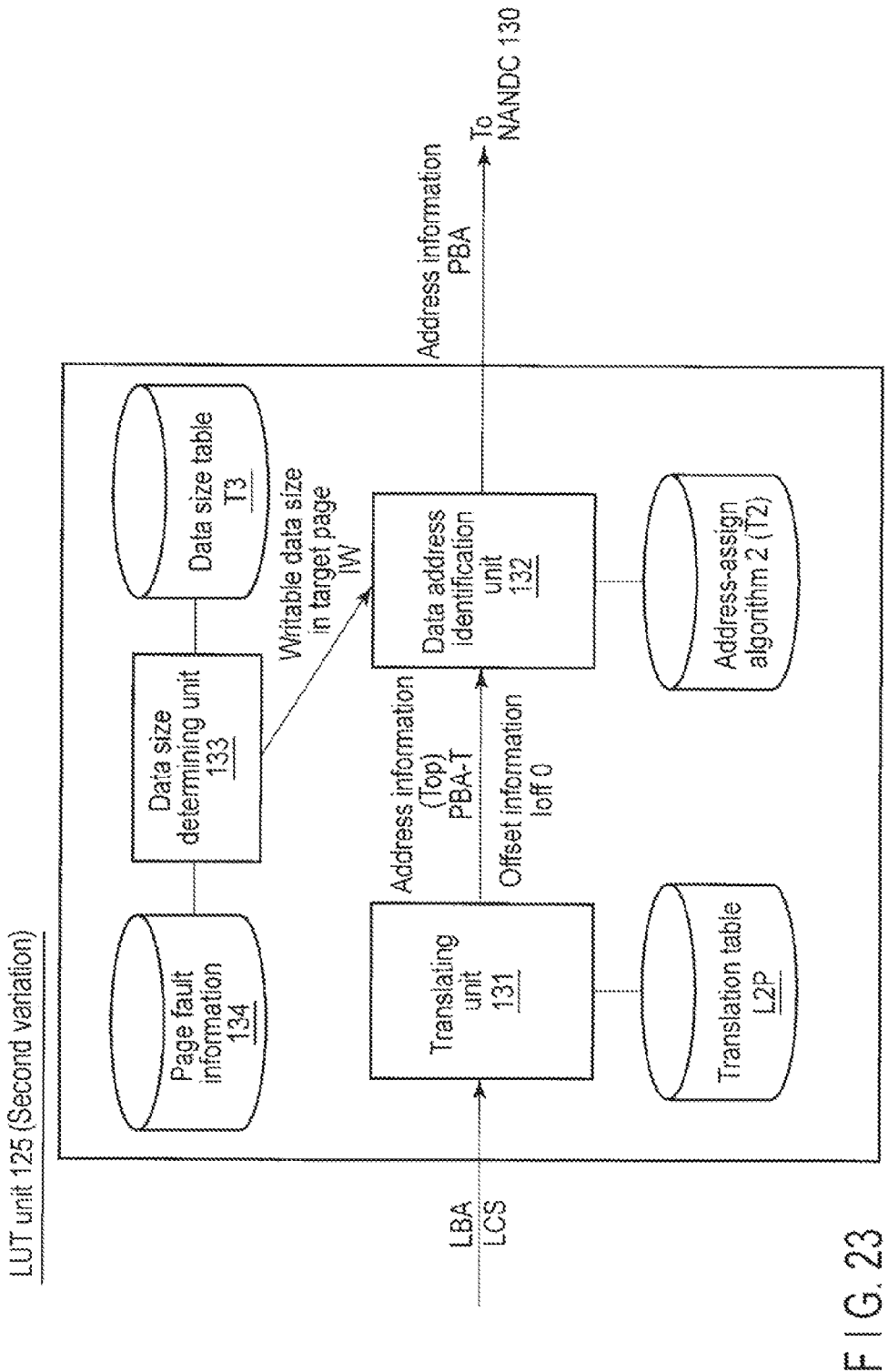
FIG. 23 is a block diagram showing an LUT unit in a memory device according to a variation of the second embodiment.
Figure 24:
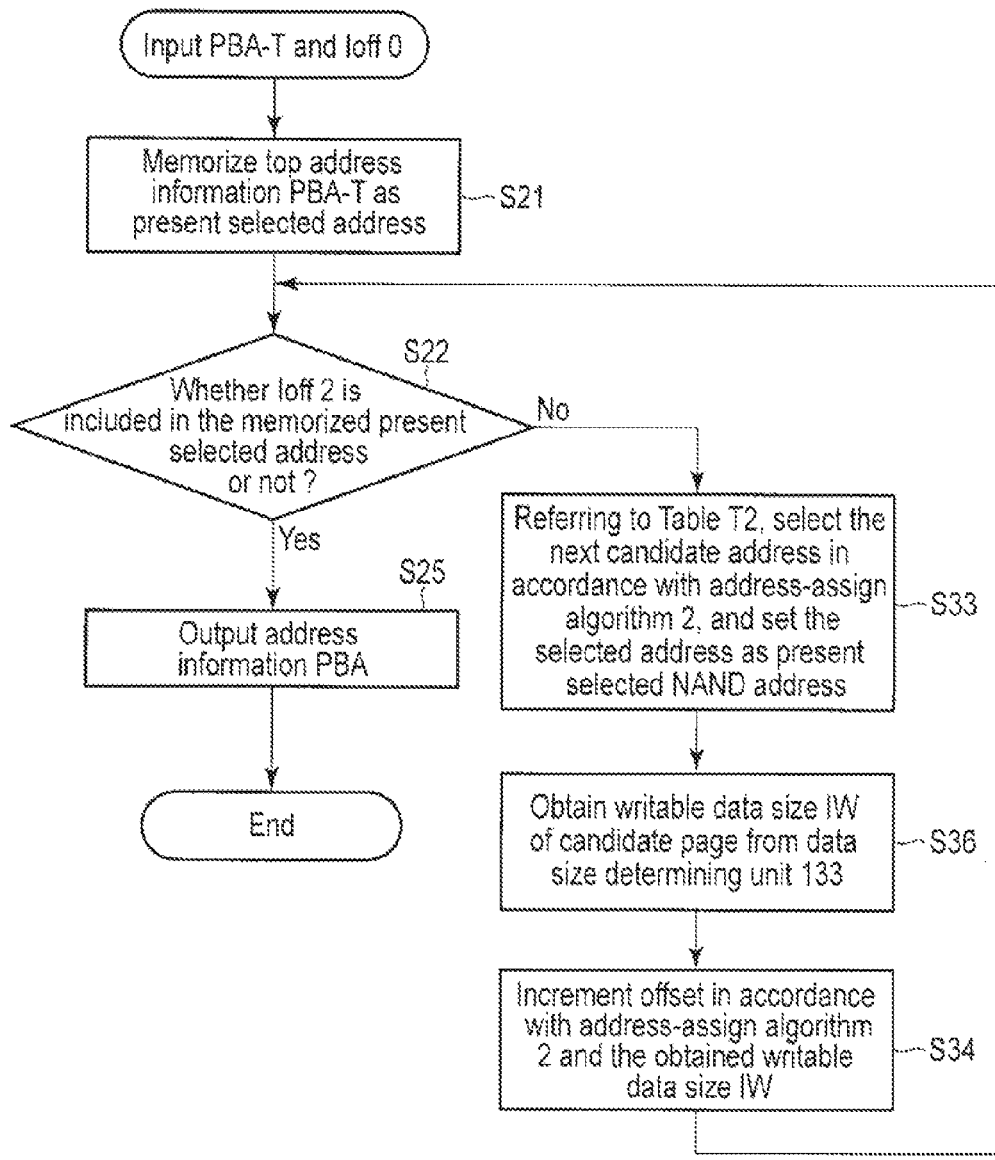
FIG. 24 is a flow chart showing address-identify operation carried out by the LUT unit in the memory device according to the variation of the second embodiment.
Figure 25:
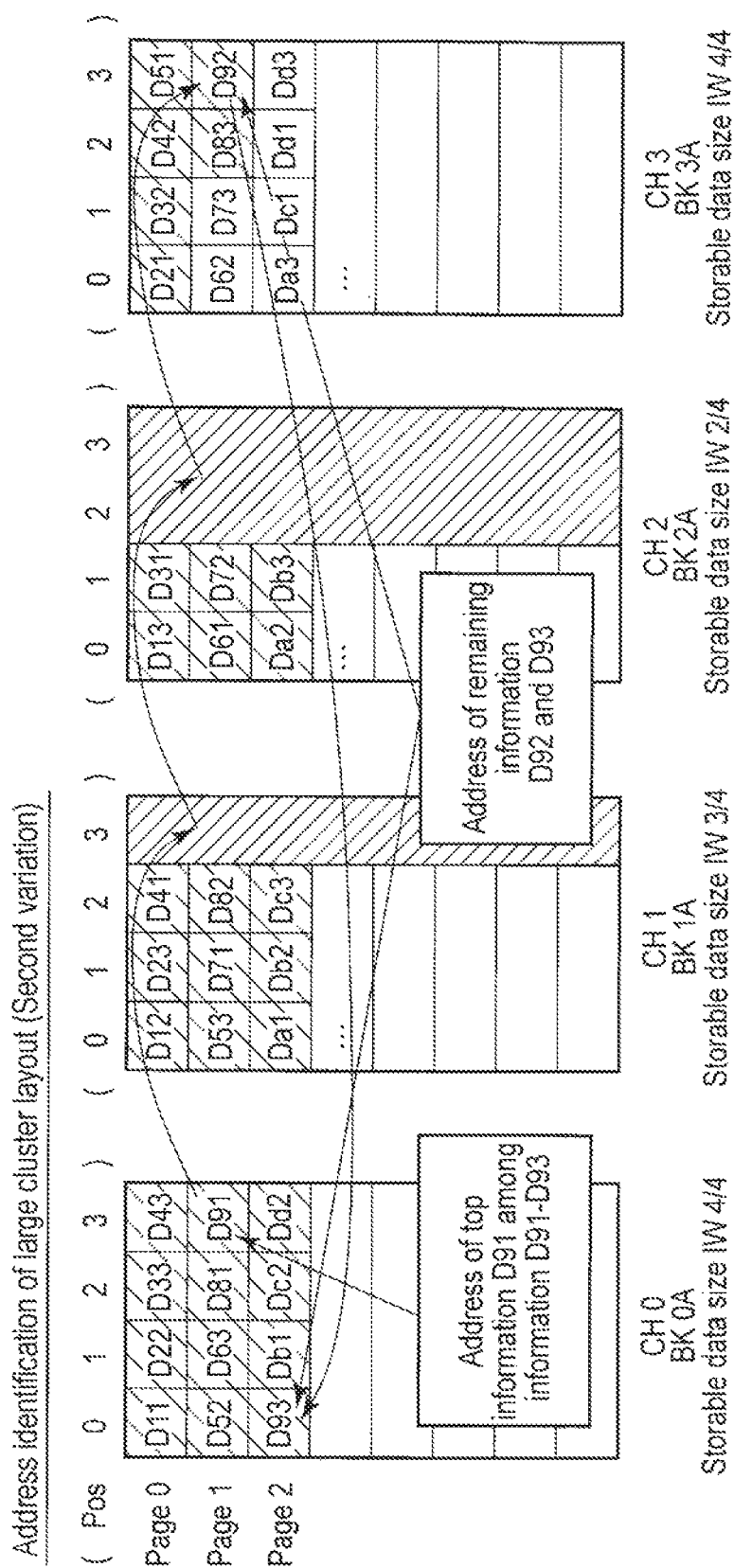
FIG. 25 shows address identification of a large cluster according to the variation of the second embodiment.

Next, referring to FIG. 23-FIG. 25, a memory device 10 according to a second variation is described. The second variation is a modification example of the second embodiment. According to the second variation, the writable data size to each block is altered utilizing variable-length ECC. To be more precise, in the second variation, information of 'data size storable in each page of each physical block' is used, in addition to the address-assign algorithm 2 for writing data, in order to estimate cluster data layout. In the following description, no detailed explanation of configurations and operations substantially overlapping to those of the second embodiment is given.

[LUT Unit]

As shown in FIG. 23, an LUT unit 125 according to the second variation differs from the one according to the second embodiment in that a data size determining unit 133, page fault information 134, and a data size table T3 are further included.

The data size determining unit 133 determines the writable data size IW in a target page in accordance with the information provided by the page fault information 134 and the data size table T3. Then, the data size determining unit 133 transmits the determined writable data size IW to the data address identification unit 132.

The data fault information 134 is information associated with data fault in each page of each block.

The data size table T3 shows the writable data size which fluctuates on the basis of the strength of variable-length ECC.

[Address-Identify Operation (LUT Unit)]

Next, referring to FIG. 24, an address-identify operation by the LUT unit 125 according to the second variation is described.

As shown, the address-identify operation according to the second variation differs from the second embodiment in that step S36 is further included.

In step S36, the data size determining unit 133 determines and obtains the writable data size IW in a target page in accordance with the information provided by the page fault information 134 and the data size table T3. The obtained determined writable data size IW is transmitted from the data size determining unit 133 to the data address identification unit 132.

In the following step S34, the data address identification unit 132 identifies the address information PBA on the basis of the transmitted page writable data size IW in addition to the address-assign algorithm 2. Subsequently, the data address identification unit 132 increments offset information Ioff, likewise.

Since the other configurations and operations are substantially the same to those of the first embodiment, they are not described in detail.

Advantageous Effects

As described above, by utilizing the configuration and operation of the memory device 10 according to the second variation, at least the three effects (1)-(3) listed above are obtained.

To be more precise, the memory device 10 according to the second variation further includes the data size determining unit 133, the page fault information 134, and the data size table T3. The data size determining unit 133 determines the writable data size IW in a target page in accordance with the information provided by the page fault information 134 and the data size table T3. The data size determining unit 133 transmits the determined writable data size IW to the data address identification unit 132 (S36 in FIG. 24).

Therefore, the data address identification unit 132 identifies the address information PBA on the basis of the transmitted page writable data size IW in addition to the address-assign algorithm 2 (S34 in FIG. 24).

For example, the logical block address space according to the first variation is shown in FIG. 25. As shown in FIG. 25, since data fault degrees of blocks BK0A and BK3A with channel CH0 and CH3 are within a predetermined range, there is no need to increase the ECC strength, and the storable data size IW, which is the storable size of user data, is four-quarters (4/4). On the other hand, in blocks BK1A and BK2A with channel CH1 and CH2, the ECC strength is increased and each of the storable data size IW is reduced to three-quarters (3/4) and two-quarters (2/4).

The data address identification unit 132 identifies the data address PBA by utilizing the above information (storable data size IW) in addition to the address-assign algorithm 2. To be more precise, the data address identification unit 132 identifies the remaining data address on the basis of the data size of already-stored data in a page, data size needed, and the storable data size IW of each page.

For example, when identifying the remaining data D92 and D93 on the basis of data D91 of the top small cluster configuring a large cluster LC9, the data address identification unit 132 identifies the address of the second data D92 on the basis of the top address information PBA-T (CH0, P1, Pos3). To be more precise, the data address identification unit 132 identifies the address information PBA-2 (CH3, P1, Pos3) of the second data D92 on the basis of the top address information PBA-T (CH0, P1, Pos3), data fault information, and information that the storable data sizes IW are 3/4, 2/4, 4/4.

Likewise, when identifying the third data D93, the data address identification unit 132 identifies the address information PBA-3 (CH0, P2, Pos0) of the third data D93 on the basis of the second address information PBA-2 (CH3, P1, Pos3), data fault information, and information that the storable data size IW is 4/4.

As described above, in the second variation, a candidate address is determined in accordance with the basic address-assign algorithm 2, by units of switching addresses SC. In addition, whether the rest of a cluster data LC can be arranged in the page is determined on the basis of the page fault information and the data size information IW, all address information PBA of a cluster LC is determined sequentially, and then all address information PBA is identified.

Therefore, the second variation enables to handle page fault in the NAND memory 11 with flexibility.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
a nonvolatile memory including a plurality of memory chips; and
a memory controller configured to:
upon receiving an access command including a size of data to be accessed and a logical address corresponding to a part of the data to be accessed, translate the logical address to a physical address of the nonvolatile memory, by referring to a first table storing a correspondence between physical addresses of the nonvolatile memory and logical addresses,
identify remaining physical addresses corresponding to the data to be accessed in accordance with the access command, other than the translated physical address, based on the size of the data to be accessed and the translated physical address, and by referring to a second table indicating a sequence of accessing the memory chips of the nonvolatile memory, and
access the nonvolatile memory at the translated and identified physical addresses.

2. The memory device according to claim 1, wherein each of the memory chips includes a plurality of blocks, each block having a plurality of pages, each page having a plurality of units.

3. The memory device according to claim 2, wherein the logical address included in the access command is a logical address corresponding to a leading portion of the data to be accessed, and
the physical addresses stored in the table correspond to logical addresses of leading portions of data that have been written.

4. The memory device according to claim 2, wherein first and second portions of the data to be accessed in order according to the sequence are stored in continuous units in a same page, when the first portion is not stored in a last unit of a page.

5. The memory device according to claim 4, wherein the first and second portions of the data to be accessed are stored in different memory chips, when the first portion is stored in a last unit of a page.

6. The memory device according to claim 2, wherein first and second portions of the data to be accessed in order according to the sequence are stored in pages of a same page number in different memory chips.

7. The memory device according to claim 2, wherein the size of the data to be accessed is greater than a size of the unit and smaller than a size of the page.

8. The memory device according to claim 2, wherein the memory controller is further configured to identify a defective page in the nonvolatile memory, and identify the physical addresses to be accessed also based on physical addresses of the defective page.

9. The memory device according to claim 1, wherein the access includes data reading.

10. The memory device according to claim 1, wherein the memory controller is further configured to change a length of an error correction code attached to data written into the nonvolatile memory, and identify the physical addresses to be accessed also based on the length of the error correction code.

11. A storage system comprising:
a host device; and
a plurality of memory devices configured to store data in accordance with a command from the host device, wherein each of the memory devices includes:
a nonvolatile memory including a plurality of memory chips; and
a memory controller configured to:
upon receiving an access command including a size of data to be accessed and a logical address corresponding to a part of the data to be accessed, translate the logical address to a physical address of the nonvolatile memory, by referring to a first table storing a correspondence between physical addresses of the nonvolatile memory and logical addresses,
identify remaining physical addresses corresponding to the data to be accessed in accordance with the access command, other than the translated physical address, based on the size of the data and the translated physical address, and by referring to a second table indicating a sequence of accessing the memory chips of the nonvolatile memory, and
access the nonvolatile memory at the translated and identified physical addresses.

12. The storage system according to claim 11, wherein each of the memory chips includes a plurality of blocks, each block having a plurality of pages, each page having a plurality of units.

13. The storage system according to claim 12, wherein the logical address included in the access command is a logical address corresponding to a leading portion of the data to be accessed, and
the physical addresses stored in the table correspond to logical addresses of leading portions of data that have been written.

14. The storage system according to claim 12, wherein first and second portions of the data to be accessed in order according to the sequence are stored in continuous units in a same page, when the first portion is not stored in a last unit of a page.

15. The storage system according to claim 14, wherein the first and second portions of the data to be accessed are stored in different memory chips, when the first portion is stored in a last unit of a page.

16. The storage system according to claim 12, wherein first and second portions of the data to be accessed in order according to the sequence are stored in pages of a same page number in different memory chips.

17. The storage system according to claim 12, wherein the size of the data to be accessed is greater than a size of the unit and smaller than a size of the page.

18. The storage system according to claim 12, wherein the memory controller is further configured to identify a defective page in the nonvolatile memory, and identify the physical addresses to be accessed also based on physical addresses of the defective page.

19. The storage system according to claim 11, wherein the access includes data reading.

20. The storage system according to claim 11, wherein the memory controller is further configured to change a length of an error correction code attached to data written into the nonvolatile memory, and identify the physical addresses to be accessed also based on the length of the error correction code.

* * * * *